United States Patent
Cho et al.

(10) Patent No.: US 9,954,475 B2
(45) Date of Patent: Apr. 24, 2018

(54) MOTOR DRIVING APPARATUS

(71) Applicants: Samsung Electronics Co., Ltd., Gyeonggi-do (KR); Seoul National University R&DB Foundation, Seoul (KR)

(72) Inventors: Je Hyung Cho, Gyeonggi-do (KR); Seung-Ki Sul, Seoul (KR); Se Hwa Choe, Jeollabuk-do (KR); Han Sol Seo, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/069,955

(22) Filed: Mar. 14, 2016

(65) Prior Publication Data

US 2016/0268950 A1    Sep. 15, 2016

(30) Foreign Application Priority Data

Mar. 13, 2015  (KR) .......................... 10-2015-0034740

(51) Int. Cl.
| | |
|---|---|
| *H02P 25/00* | (2006.01) |
| *H02P 27/06* | (2006.01) |
| *H02P 27/14* | (2006.01) |
| *H02M 7/487* | (2007.01) |

(52) U.S. Cl.
CPC ............ *H02P 27/06* (2013.01); *H02M 7/487* (2013.01); *H02P 27/14* (2013.01)

(58) Field of Classification Search
CPC ........ H02P 27/06; H02P 27/14; H02M 7/483; H02M 1/14

USPC ............................................. 318/400.14, 504
See application file for complete search history.

(56) References Cited

U.S. PATENT DOCUMENTS

| | | | |
|---|---|---|---|
| 6,031,738 A | 2/2000 | Lipo et al. | |
| 2006/0066283 A1* | 3/2006 | Ota | H02M 5/4585 318/803 |
| 2006/0245216 A1* | 11/2006 | Wu | H02M 7/487 363/13 |

(Continued)

OTHER PUBLICATIONS

Extended European Search Report dated Aug. 10, 2016 in connection with European Application No. 16159736.4, 7 pages.

(Continued)

*Primary Examiner* — Eduardo Colon Santana
*Assistant Examiner* — Gabriel Agared

(57) ABSTRACT

A motor driving apparatus includes a rectifying circuit to rectify an AC power supplied from an external AC power source, one pair of film capacitors to output a DC voltage and a neutral point voltage by removing a ripple of a voltage rectified by the AC-DC conversion unit, a 3-level inverter to supply a driving current to a motor using the DC voltage applied from the DC link unit, and a control module to control the 3-level inverter. The control module includes a motor speed control module to control the rotation of the motor, a DC voltage control module to stabilize the DC voltage, a neutral point voltage control module to stabilize the neutral point voltage, and a stabilizing voltage limiting module to control the DC voltage control module and the neutral point voltage control module according to an output of the motor speed control module.

20 Claims, 23 Drawing Sheets

(56) References Cited

U.S. PATENT DOCUMENTS

2008/0151583 A1    6/2008  Matsumoto
2009/0309528 A1*  12/2009  Hanada .................. B60L 11/18
                                                  318/400.32
2012/0155135 A1    6/2012  Fujii
2014/0301041 A1*  10/2014  Kitanaka ............... H02M 7/003
                                                      361/697

OTHER PUBLICATIONS

Ramkrishan Maheshwari, et al., "Design of Neutral-Point Voltage Controller of Three-Level NPC Inverter with Small DC-Link Capacitors", IEEE Transactions on Industrial Electronics, vol. 60, No, 5, IEEE Service Center, Piscataway, New Jersey, May 1, 2013, 11 pages.

C. Newton, et al., "Neutral Point Control for Multi-Level Inverters: Theory, Designa and Operational Limitations", Conference Record Industry Applications Society Annual Meeting, New Orleans, Louisiana, Oct. 5-9, 1997, 8 pages.

* cited by examiner (a)

(b)

(a)

(b)

(a)

(b)

(a)

(b)

(a)

(b)

(a)

(b)

MOTOR DRIVING APPARATUS

CROSS-REFERENCE TO RELATED APPLICATION AND CLAIM OF PRIORITY

The present application is related to and claims benefit of Korean Patent Application No. 10-2015-0034740, filed on Mar. 13, 2015 in the Korean Intellectual Property Office, the disclosure of which is incorporated herein by reference.

TECHNICAL FIELD

The disclosed relates to a motor driving apparatus, and more particularly, to a motor driving apparatus to drive or control a three-phase motor.

BACKGROUND

Motors are not only being widely used in home appliances such as a washing machine, a refrigerator, an air conditioner, a vacuum cleaner, and the like, but are also being used in an electric vehicle, a hybrid vehicle, and the like, which are recently gaining attention.

Among the types of motors, a permanent magnet motor that uses a permanent magnet rotates a rotor using a magnetic interaction between a magnetic field generated by a coil through which a current flows and a magnetic field generated by the permanent magnet.

A driving apparatus such as an inverter capable of applying a driving voltage is required to drive the permanent magnet motor. Since a magnetic field generated by the rotor of the permanent magnet motor is determined in accordance with a position of the rotor, the inverter has to apply a driving voltage in consideration of the position of the rotor.

In addition, an alternating current (AC) power having a set frequency is supplied to households and businesses. In contrast, the motor driving apparatus supplies an AC power in which a frequency and level are capable of being changed, thereby rotating the permanent magnet motor.

For this, a commercially used AC power is rectified to be converted into a direct current (DC) power, and the DC power is reconverted into an AC power of desired frequency and level using the driving apparatus such as the inverter.

Here, an electrolytic capacitor is widely being used for stabilizing the DC power rectified from the AC power. However, the electrolytic capacitor has a short life. Also, although a high-capacity capacitor is used to supply a stable DC power, there is a problem in which the high-capacity capacitor has a large volume.

SUMMARY

To address the above-discussed deficiencies, it is a primary object to provide a motor driving apparatus having a sufficient life and a small volume.

Another aspect of the disclosure is to provide a motor driving apparatus capable of stably providing a DC voltage and a neutral point voltage to a 3-level inverter even when a low-capacity capacitor is used at a DC terminal.

According to one aspect of the disclosure, a motor driving apparatus includes a rectifying circuit to rectify an AC power supplied from an external AC power source, at least one film capacitor to output a DC voltage and a neutral point voltage according to a voltage rectified by the AC-DC conversion unit, a 3-level inverter to supply a driving current to a motor using the DC voltage applied from the DC link unit, and a control module to control the 3-level inverter. The control module includes a motor speed control module to control the rotation of the motor, a DC voltage control module to stabilize the DC voltage, a neutral point voltage control module to stabilize the neutral point voltage, and a stabilizing voltage limiting module to control the DC voltage control module and the neutral point voltage control module according to an output of the motor speed control module.

According to an embodiment, the motor speed control module may output a first voltage reference for controlling a rotation speed of the motor according to the rotation speed of the motor and the driving current.

According to an embodiment, when the first voltage reference is greater than a reference voltage, the stabilizing voltage limiting module may decrease outputs of the DC voltage control module and the neutral point voltage control module.

According to an embodiment, the stabilizing voltage limiting module may output a proportional constant to control the DC voltage control module and a maximum offset voltage and a minimum offset voltage to control the neutral point voltage control module according to the first voltage reference.

According to an embodiment, when the first voltage reference is greater than the reference voltage, the stabilizing voltage limiting module may decrease the proportional constant and the maximum offset voltage.

According to an embodiment, when the first voltage reference is equal to or smaller than the reference voltage, the stabilizing voltage limiting module may output a reference proportional constant, a reference maximum offset voltage, and a reference minimum offset voltage.

According to an embodiment, the reference voltage may be changed in accordance with the priority of the motor speed control module.

According to an embodiment, the reference proportional constant may be changed in accordance with the priority of the DC voltage control module.

According to an embodiment, the reference maximum offset voltage may be changed in accordance with the priority of the neutral point voltage control module.

According to an embodiment, the DC voltage control module may output a second voltage reference proportional to the proportional constant for stabilizing the DC voltage.

According to an embodiment, the DC voltage control module may include an equivalent driving current estimator to estimate an equivalent driving current supplied to the motor according to the DC voltage and the first voltage reference, an equivalent supplied voltage estimator to estimate an equivalent supplied voltage supplied from the external power source according to the first voltage reference and the equivalent driving current, and a damping voltage calculator to calculate the second voltage reference from the DC voltage, the first voltage reference, the equivalent supplied voltage, and the proportional constant.

According to an embodiment, the neutral point voltage control module may output a third voltage reference limited by the maximum offset voltage for stabilizing the neutral point voltage.

According to an embodiment, the neutral point voltage control module may include a neutral point current calculator to calculate a neutral point current from the DC voltage and the neutral point voltage, a offset voltage calculator to calculate a offset voltage that stabilizes the neutral point voltage according to the neutral point current and the voltage references, and a offset voltage limiter to calculate the third voltage reference from the offset voltage and the maximum offset voltage.

According to an embodiment, the at least one film capacitor may include an upper film capacitor and a lower film capacitor connected to each other in series.

According to an embodiment, the DC voltage may be a voltage between both ends of the upper film capacitor and the lower film capacitor, and the neutral point voltage may be a voltage between the both ends of the lower film capacitor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. Hereinafter, an embodiment of the disclosure will be described in detail with reference to the accompanying drawings.

Figure 1:
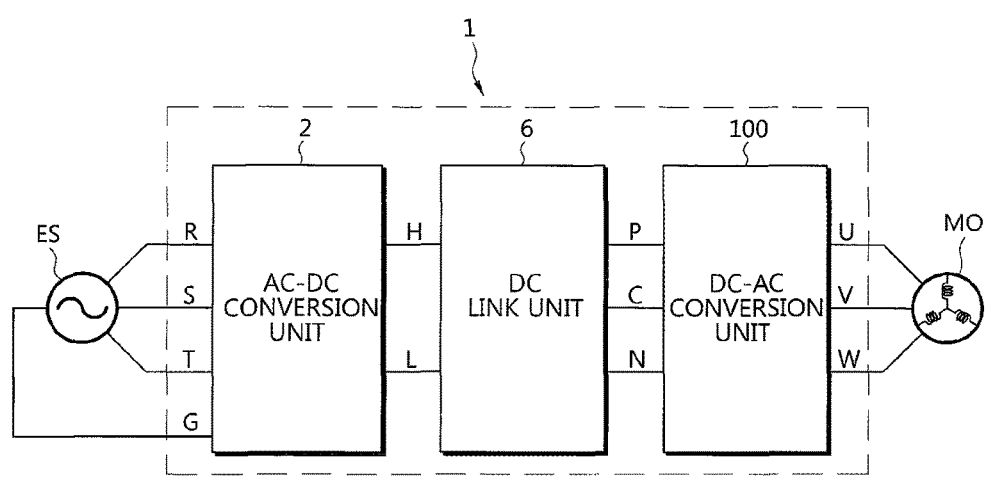
FIG. 1 illustrates a motor driving apparatus according to an embodiment.

FIG. 1 illustrates a motor driving apparatus according to an embodiment.

Referring to FIG. 1, a motor driving apparatus 1 according to an embodiment receives an AC power from an external power source ES and supplies a driving power to a motor MO in order to rotate the motor MO.

Here, the external power source ES may be a single-phase AC power of 110 V or 220 V widely used for households or a three-phase AC power of 380 V, 400 V, or 460 V widely used for industries. Also, the external power source ES may be a DC power supplied by a solar generator, and the like.

In addition, the motor MO may be a permanent magnet synchronous motor including a permanent magnet or an induction motor using electromagnetic induction.

The permanent magnet synchronous motor may include a rotor having a permanent magnet and a stator having a coil. A rotating magnetic field is generated when an AC current is supplied to the coil, and the rotor may rotate by a magnetic interaction between a magnetic field of the permanent magnet and the rotating magnetic field of the coil.

The induction motor includes a rotor which is a conductor and a stator having a coil. When the AC current is supplied to the coil, an induction current is generated at the rotor conductor along with a rotating magnetic field. Also, the rotor may rotate by a magnetic interaction between a magnetic field generated by the induction current and a magnetic field generated by the coil.

In addition, the motor MO may include a Hall sensor to detect a rotational displacement of the rotor. The Hall sensor is disposed at a proper position of the stator included in the motor MO to detect a change in the magnetic field in accordance with the rotation of the rotor, and detects a position of the rotor based on the detected change in the magnetic field.

A configuration to detect the rotational displacement of the rotor of the motor MO is not limited to the Hall sensor.

For example, the motor MO may include an encoder. The encoder may output pulse type signals in accordance with the rotation of the rotor to detect the rotational displacement or the rotation speed of the rotor based on a cycle and a number of the pulses.

In another example, the motor MO may include a resolver. The resolver may output typical waves in accordance with the rotation of the rotor and detect the rotational displacement or the rotation speed of the rotor based on the cycle and the number of the typical waves.

The motor MO provides the detected rotational displacement of the rotor to the motor driving apparatus 1 to be described below.

The motor driving apparatus 1 includes an AC-DC conversion unit 2 to convert an AC voltage and an AC current applied from the external power source ES to a DC voltage and a DC current, a DC-AC conversion unit 100 to convert the converted DC voltage and DC current to an AC voltage and an AC current having a specific frequency, and a DC link unit 6 provided between the AC-DC conversion unit 2 and the DC-AC conversion unit 100 to stabilize a DC voltage Vdc output by the AC-DC conversion unit 2 to transmit the DC voltage Vdc to the DC-AC conversion unit 100.

The AC-DC conversion unit 2 receives three-phase AC power from the external power source ES via an R-phase terminal R, an S-phase terminal S, a T-phase terminal T, and a ground terminal G, and rectifies the three-phase AC power to output the DC voltage Vdc and the DC current between a positive terminal H and a negative terminal L. Here, the ground terminal G between the external power source ES and the AC-DC conversion unit 2 is an option. In other words, when the external power source ES does not include a ground terminal, the AC-DC conversion unit 2 may not include the ground terminal G.

The DC link unit 6 is input with the DC voltage Vdc and the DC current between the positive terminal H and the negative terminal L from the AC-DC conversion unit 2, and outputs a stabilized DC voltage Vdc and DC current via a positive DC terminal P, a neutral terminal C, and a negative DC terminal N by removing a ripple of the DC voltage Vdc.

The DC-AC conversion unit 100 is input with the DC voltage Vdc and the DC current from the DC link unit 6, and supplies a three-phase AC power including a U-phase, a V-phase, and a W-phase to the motor MO by pulse width modulation.

In this way, the motor driving apparatus 1 converts the AC power of the external power source ES into an AC power having a specific frequency and supplies the converted AC power to the motor MO in order to rotate the motor MO and control the rotation speed of the motor MO.

Hereinafter, the AC-DC conversion unit 2, the DC link unit 6, and the DC-AC conversion unit 100 that form the motor driving apparatus 1 will be described in more detail.

Figure 2:
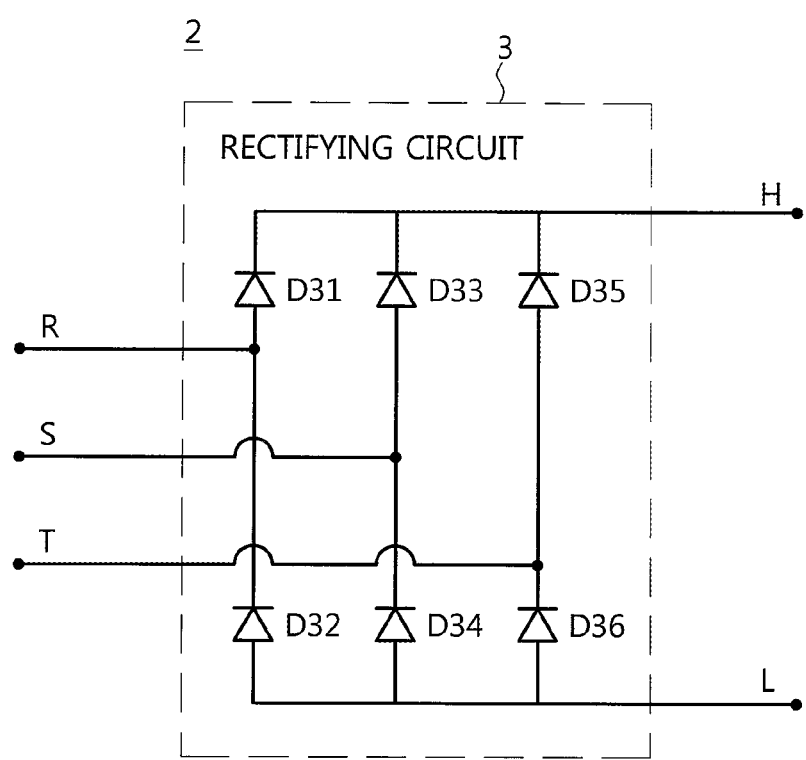
FIG. 2 illustrates an example of an AC-DC conversion unit included in the motor driving apparatus according to an embodiment.
Figure 3:
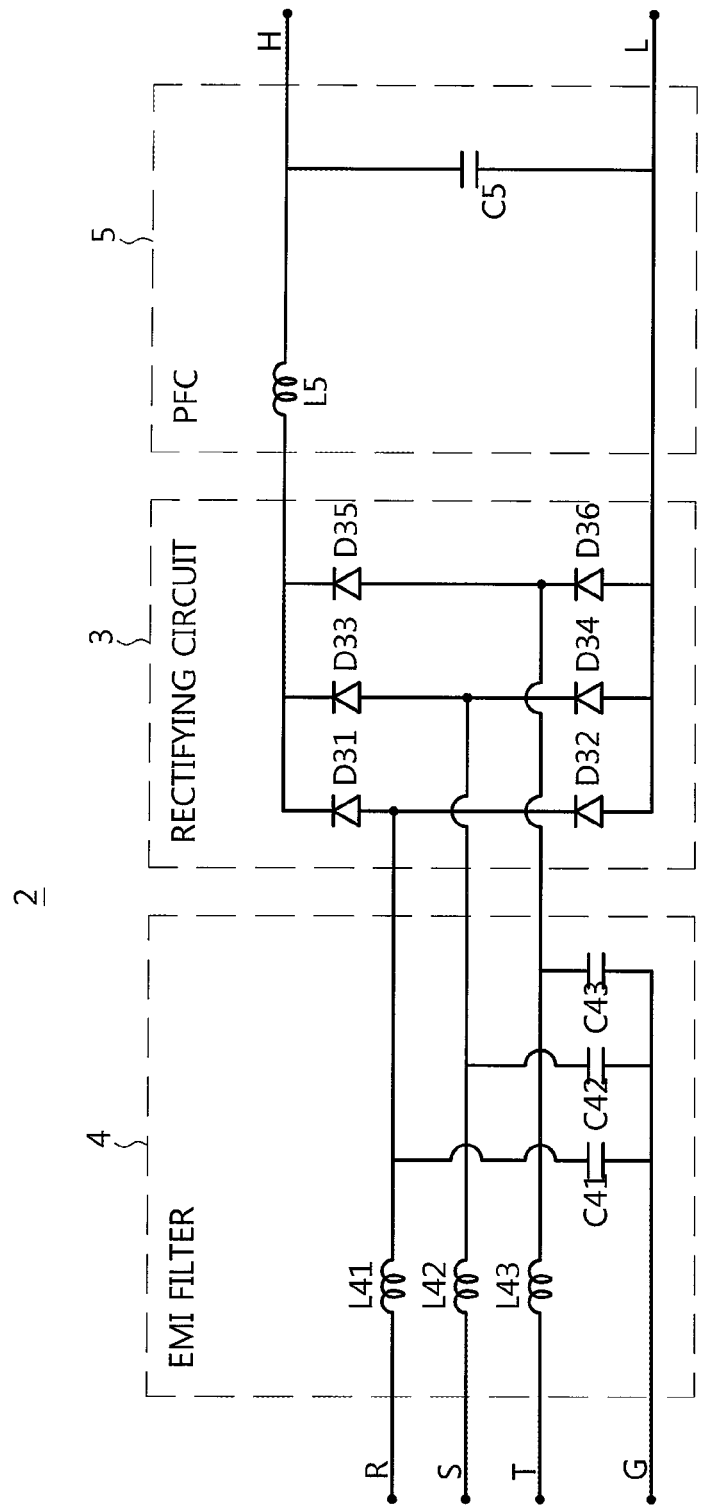
FIG. 3 illustrates another example of an AC-DC conversion unit included in the motor driving apparatus according to an embodiment.

FIG. 2 illustrates an example of an AC-DC conversion unit included in the motor driving apparatus according to an embodiment, and FIG. 3 illustrates another example of an AC-DC conversion unit included in the motor driving apparatus according to an embodiment.

As illustrated in FIG. 2, the AC-DC conversion unit 2 may include a rectifying circuit 3 to rectify the AC power of the external power source ES.

The rectifying circuit 3 may employ a diode bridge including six diodes D31 to D36. Specifically, three upper diodes D31, D33, and D35 are connected to the positive terminal H, and three lower diodes D32, D34, and D36 are connected to the negative terminal L.

In addition, the three upper diodes D31, D33, and D35 and the three lower diodes D32, D34, and D36 are connected in series by one-to-one correspondence, and three connection nodes through which the three upper diodes D31, D33, and D35 and the three lower diodes D32, D34, and D36 are connected in series are respectively connected to the R-phase terminal R, the S-phase terminal S, and the T-phase terminal T of the external power source ES.

Here, the six diodes D31 to D36 are disposed such that the AC voltage being applied from the external power source ES is applied in one direction and the AC current is supplied in one direction. In other words, as illustrated in FIG. 2, each of the six diodes D31 to D36 is disposed such that the AC voltage applied from the external power source ES is applied to the positive terminal H and the AC current flows toward the positive terminal H.

A configuration of the AC-DC conversion unit 2 is not limited to the rectifying circuit 3.

As illustrated in FIG. 3, the AC-DC conversion unit 2 may further include an electromagnetic interference filter (EMI filter) 4 to remove noise included in the AC power supplied from the external power source ES and a power factor corrector (PFC) 5 to improve a power factor, in addition to the rectifying circuit 3.

As illustrated in FIG. 3, the EMI filter 4 may be provided at a front end of the rectifying circuit 3, and may remove high-frequency noise included in the AC power supplied from the external power source ES.

The EMI filter 4 generally has a form of a low pass filter that blocks a high-frequency signal and allows a low-frequency signal to pass in order to remove the high-frequency noise. For example, as illustrated in FIG. 3, the EMI filter 4 may include three inductors L41, L42, and L43 respectively connected in series to the R-phase terminal R, the S-phase terminal S, and the T-phase terminal T to which power is supplied from the external power source ES, and three capacitors C41, C42, and C43 provided between the three inductors L41, L42, and L43 and the ground terminal G.

However, the EMI filter 4 illustrated in FIG. 3 is merely an example of a filter that may be employed, and the EMI filter 4 may have various configurations. Specifically, the EMI filter 4 may not only have a series-shunt configuration illustrated in FIG. 3 but also a shunt-series configuration, an Π configuration, and a T-configuration.

The PFC 5 may be provided at a rear end of the rectifying circuit 3 as illustrated in FIG. 3 to improve a power factor of the motor driving apparatus 1.

The power factor refers to an active power with respect to an apparent power. That is, the power factor may be viewed as a ratio of a power actually used by the motor driving apparatus 1 with respect to a power supplied from the external power source ES. A high power factor signifies that the motor driving apparatus 1 uses a great portion of the power supplied from the external power source ES, and a lower power factor signifies that the motor driving apparatus 1 uses only a small portion of the supplied power.

To use the AC power, phases of the AC voltage applied from the external power source ES and the current supplied to the motor driving apparatus 1 should be the same. When the phase of the AC voltage being applied and the phase of the current being supplied are not the same, an efficiency of the power supplied from the external power source ES to the motor driving apparatus 1 may decrease or the power may not even be supplied. The power that cannot be used by the motor driving apparatus 1 due to the phase of the AC voltage being applied and the phase of the current being supplied not being the same is referred to as a reactive power, and the power transmitted to the motor driving apparatus 1 due to the phase of the AC voltage being applied and the phase of the current being supplied being the same is referred to as the active power.

The PFC 5 makes the phase of the AC voltage applied from the external power source ES and the phase of the current supplied to the DC link unit 6 and the DC-AC conversion unit 100 to be described below to be the same using an inductor L5 and a capacitor C5. As a result, the PFC 5 may improve the power factor of the AC power supplied from the external power source ES.

However, the PFC 5 is not limited to a passive PFC illustrated in FIG. 3. For example, the PFC 5 may employ an active PFC including a switch (not shown) and a diode (not shown). Also, the diode (not shown) may be replaced by the switch (not shown).

Furthermore, the PFC 5 is not limited to being provided at the rear end of the rectifying circuit 3, and the PFC 5 may be provided at the front end of the rectifying circuit 3 or integrally provided with the rectifying circuit 3.

As described above, the AC-DC conversion unit 2 may include the rectifying circuit 3, the EMI filter 4, and the PFC 5.

Figure 4:
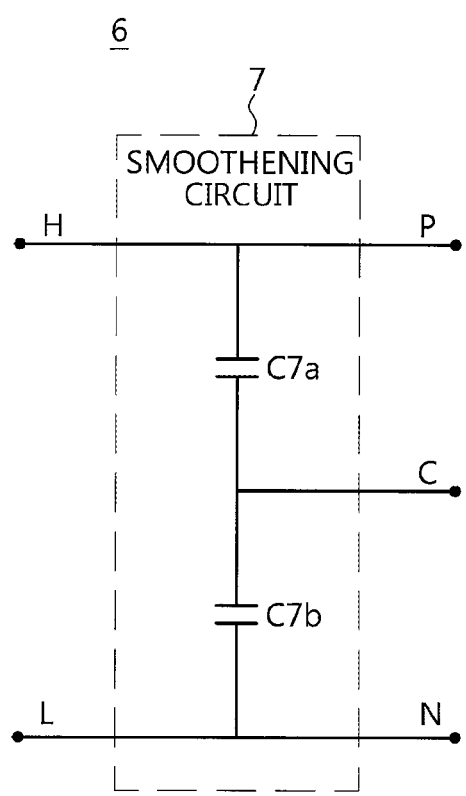
FIG. 4 illustrates an example of a DC link unit included in the motor driving apparatus according to an embodiment.
Figure 5:
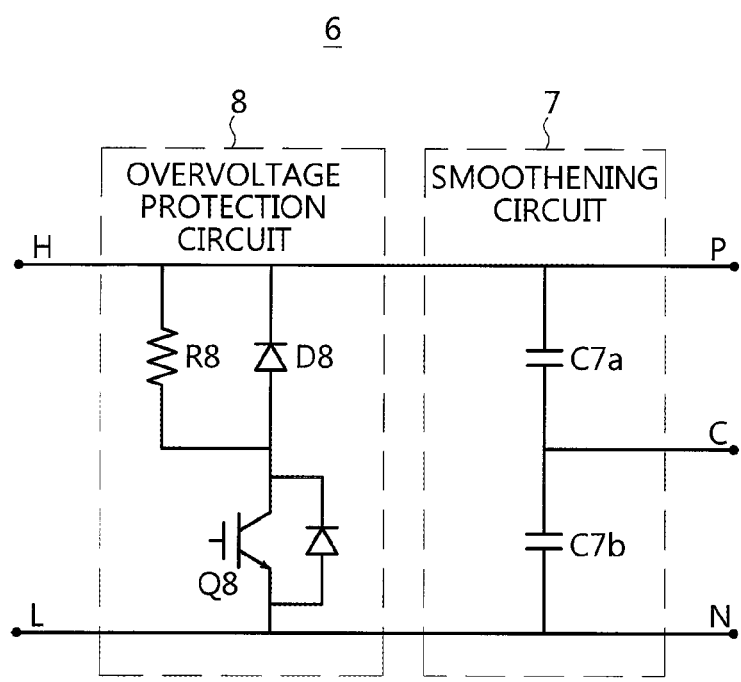
FIG. 5 illustrates another example of a DC link unit included in the motor driving apparatus according to an embodiment.

FIG. 4 illustrates an example of a DC link unit included in the motor driving apparatus according to an embodiment, and FIG. 5 illustrates another example of a DC link unit included in the motor driving apparatus according to an embodiment.

As illustrated in FIG. 4, the DC link unit 6 may include a smoothening circuit 7 to remove a ripple included in the voltage rectified by the AC-DC conversion unit 2.

The smoothening circuit 7 may include an upper capacitor C7a and a lower capacitor C7b connected to each other in series. Here, the pair of capacitors C7a and C7b may have the same capacitance.

The smoothening circuit 7 removes the ripple included in the voltage rectified by the AC-DC conversion unit 2, and outputs the stabilized DC voltage Vdc to the DC-AC conversion unit 100. Specifically, the DC link unit 6 outputs a voltage of the upper capacitor C7a between the positive DC terminal P and a neutral terminal C, and outputs a voltage of the lower capacitor C7b between the neutral terminal C and the negative DC terminal N.

In addition, the smoothening circuit 7 also serves as a DC power source that supplies a DC power to the DC-AC conversion unit 100. Specifically, the pair of capacitors C7a and C7b constituting the smoothening circuit 7 store electrical energy provided by the AC-DC conversion unit 2 and supply the stored electrical energy to the DC-AC conversion unit 100.

In addition, a conventional motor driving apparatus used a high-capacity capacitor as the smoothening circuit 7 in order to provide a stable DC power to the DC-AC conversion unit 100. For example, the conventional motor driving apparatus used the electrolytic capacitor having a capacitance of several milli-farads.

The electrolytic capacitor may obtain a high capacitance per unit volume due to its characteristics. However, the electrolytic capacitor has a large equivalent resistance. Thus, a high heat loss occurs due to the large equivalent resistance, and an electrolyte evaporates and a life of the capacitor is shortened due to the high heat loss.

As a result, an acceptable root-mean-square (RMS) current of the electrolytic capacitor is smaller than other capacitors. Although a plurality of electrolytic capacitors were connected in parallel to increase the acceptable RMS current conventionally, the volume of the motor driving apparatus enlarged as a result.

Due to this reason, the motor driving apparatus 1 uses a film capacitor of low-capacity (tens of μF) as the smoothening circuit 7 constituting the DC link unit 6. In other words, the pair of capacitors C7a and C7b constituting the smoothening circuit 7 use the low-capacity film capacitor.

The film capacitor has a small equivalent resistance of approximately 1/10 of that of the electrolytic capacitor. As a result, the electrolytic capacitor has approximately 5,000 hours to 10,000 hours of life, whereas the film capacitor has approximately 100,000 hours of life.

The configuration of the DC link unit 6 is not limited to the smoothening circuit 7.

As illustrated in FIG. 5, the DC link unit 6 may further include an overvoltage protection circuit 8 to prevent an overvoltage of the smoothening circuit 7, in addition to the smoothening circuit 7.

The overvoltage protection circuit 8 may include a resistive element R8, a diode D8 to prevent a reverse current, and a switching element Q8 that is turned on when an overvoltage is detected. Also the resistive element R8 and the diode D8 are connected to the positive terminal H in parallel, and the switching element Q8 is connected to the resistive element R8 and the diode D8 in series. Here, the resistive element R8 may employ a varistor, an electrical resistance value of which changes in accordance with a resistor or applied voltage having a constant electrical resistance value.

When the overvoltage of the smoothening circuit 7 is detected, the switching element Q8 is turned on, and a current flows from the smoothening circuit 7 via the resistive element R8 and the switching element Q8. As a result, the electrical energy stored in the smoothening circuit 7 is consumed, and the voltage of the smoothening circuit 7 decreases. As described above, the DC link unit 6 may include the smoothening circuit 7 and the overvoltage protection circuit 8, and particularly, the smoothening circuit 7 includes the upper capacitor C7a and the lower capacitor C7b formed of the film capacitor.

Figure 6:
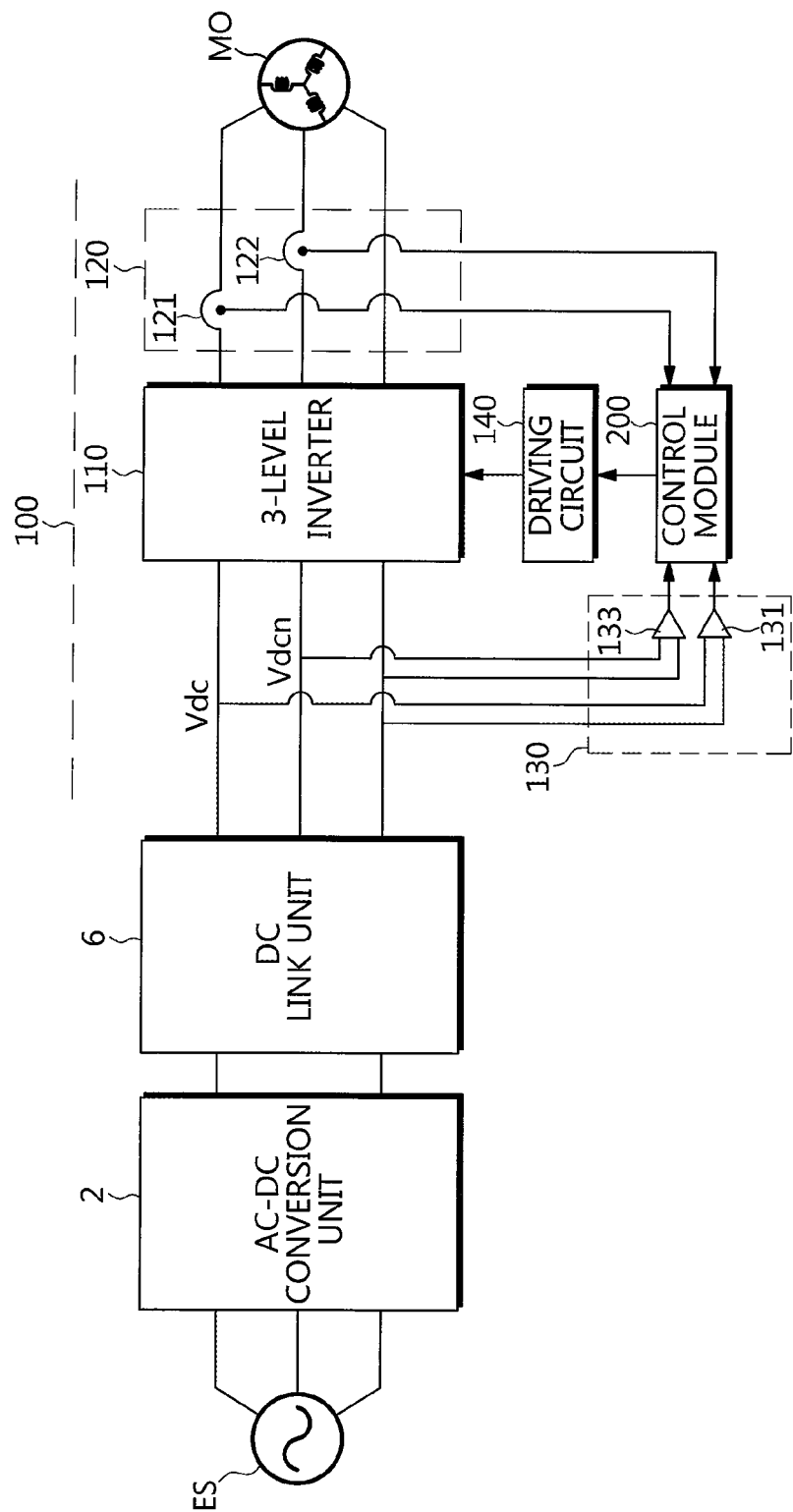
FIG. 6 illustrates a DC-AC conversion unit included in the motor driving apparatus according to an embodiment.
Figure 7:
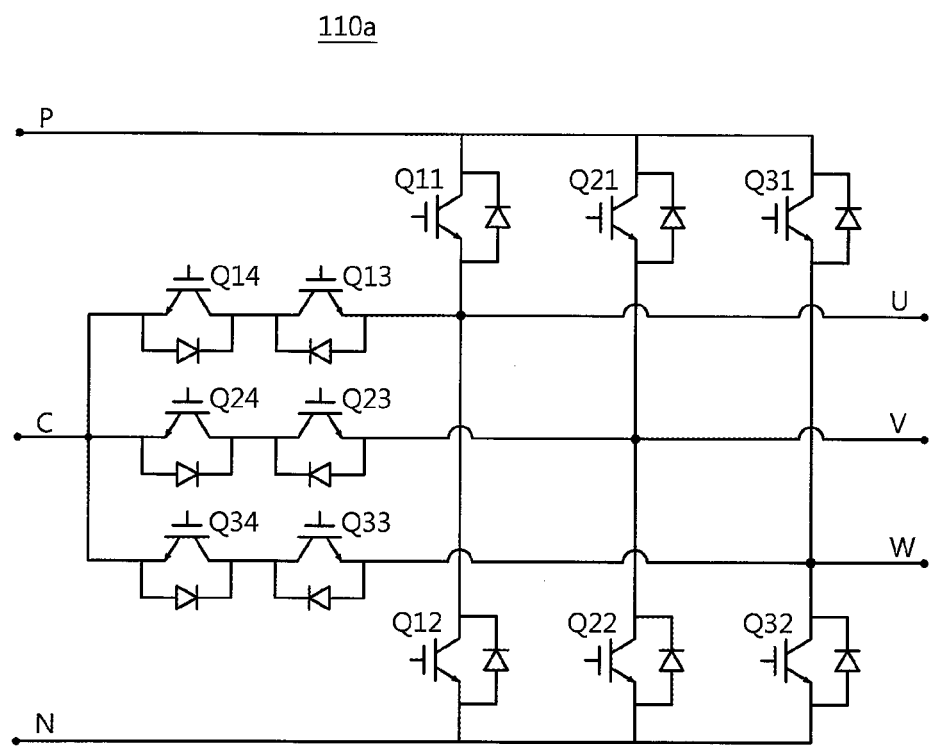
FIG. 7 illustrates an example of a 3-level inverter included in the motor driving apparatus according to an embodiment.
Figure 8:
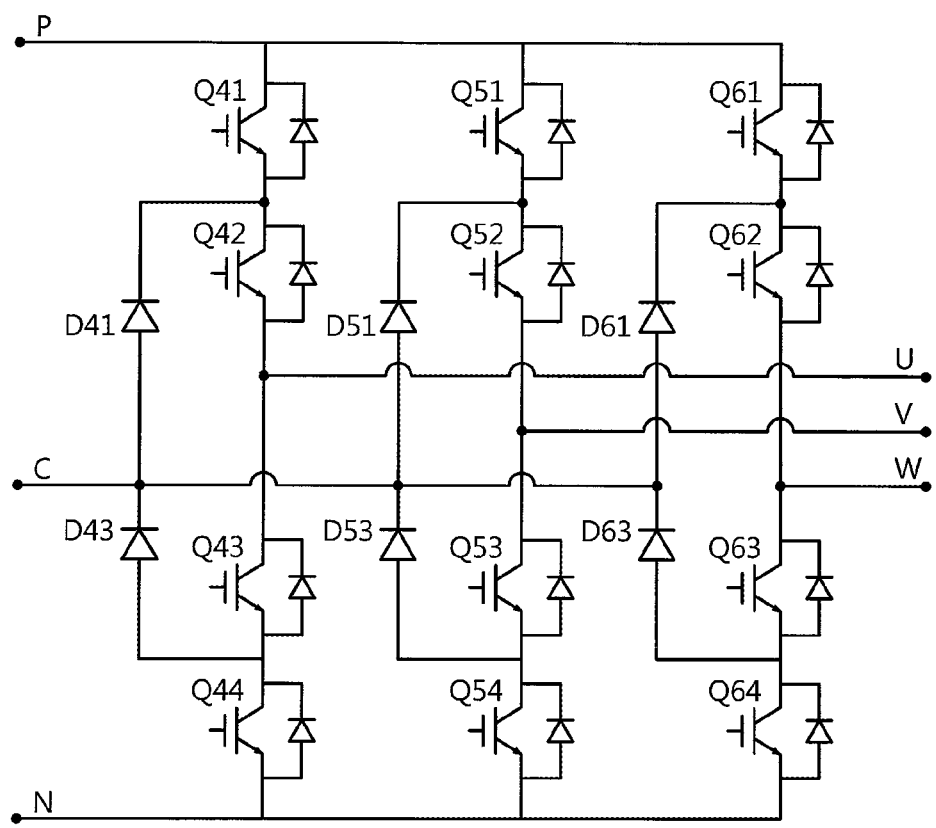
FIG. 8 illustrates another example of a 3-level inverter included in the motor driving apparatus according to an embodiment.

FIG. 6 illustrates a DC-AC conversion unit included in the motor driving apparatus according to an embodiment. Also, FIG. 7 illustrates an example of a 3-level inverter included in the motor driving apparatus according to an embodiment, and FIG. 8 illustrates another example of a 3-level inverter included in the motor driving apparatus according to an embodiment.

The DC-AC conversion unit 100 includes a 3-level inverter 110 to supply a driving voltage and driving current to the motor MO, a current detection unit 120 to detect the driving current supplied to the motor MO, a voltage detection unit 130 to detect the DC voltage Vdc applied to the 3-level inverter 110, a control module 200 to output a control signal for controlling the 3-level inverter 110 according to the detected results of the current detection unit 120 and the voltage detection unit 130, and a driving circuit 140 to output a driving signal to the 3-level inverter 110 in accordance with the control signal of the control module 200.

The DC voltage Vdc is applied to the 3-level inverter 110 from the DC link unit 6 via the positive DC terminal P, the neutral terminal C, and the negative DC terminal N. Also, the 3-level inverter 110 applies the driving voltage to the motor MO in accordance with the driving signal of the driving circuit 140, and supplies the driving current. Here, the driving voltage and the driving current output by the 3-level inverter 110 have forms of an AC voltage and an AC current.

The 3-level inverter 110 may be implemented using various topologies. For example, the 3-level inverter 110 may employ a T-type neutral point clamped inverter 110a, a diode-clamped inverter 110b, and the like.

First, the T-type neutral point clamped inverter 110a illustrated in FIG. 7 will be described.

The T-type neutral point clamped inverter 110a may include six switch inverters Q11, Q12, Q21, Q22, Q31, and Q32, one pair of neutral switching elements Q14 and Q13 to connect between the neutral terminal C and a U-phase terminal U, one pair of neutral switching elements Q24 and Q23 to connect between the neutral terminal C and a V-phase terminal V, and one pair of neutral switching elements Q34 and Q33 to connected between the neutral terminal C and a W-phase terminal W. Here, orders of the pairs of neutral switching elements Q14 and Q13, Q24 and Q23, and Q34 and Q33 may be changed.

Specifically, first, second, and third upper switching elements Q11, Q21, and Q31 are provided between each of the three output terminals U, V, and W and the positive DC terminal P, and first, second, and third lower switching elements Q12, Q22, and Q32 are provided between each of the three-phase output terminals U, V, and W and the negative DC terminal N.

In addition, as described above, the three pairs of neutral switching elements Q14 and Q13, Q24 and Q23, and Q34 and Q33 are respectively provided between the three-phase output terminals U, V, and W and the neutral terminal C. Specifically, a first left switching element Q14 and a first right switching element Q13 are provided between the neutral terminal C and the U-phase terminal U, a second left switching element Q24 and a second right switching element Q23 are provided between the neutral terminal C and the V-phase terminal V, and a third left switching element Q34 and a third right switching element Q33 are provided between the neutral terminal C and the W-phase terminal W.

The three upper switching elements Q11, Q21, and Q31, the three lower switching elements Q12, Q22, and Q32, and the three pairs of neutral switching devices Q14 and Q13, Q24 and Q23, and Q34 and Q33 are opened and closed by the driving signal output by the driving circuit 140.

For example, when the first upper switching element Q11 and the second left switching element Q24 are closed, the driving current may flow to the motor MO from the positive DC terminal P via the first upper switching element Q11 and the U-phase terminal U, and flow to the neutral terminal C from the motor MO via the V-phase terminal V and the second left switching element Q24.

In another example, when the first right switching element Q13 and the second lower switching element Q22 are closed, the driving current may flow to the motor MO from the neutral terminal C via the first right switching element Q13 and the U-phase terminal U, and flow to the negative DC terminal N from the motor MO via the V-phase terminal V and the second lower switching element Q22.

Ultimately, the driving current flows to the neutral terminal C from the positive DC terminal P via the motor MO or flows to the negative DC terminal N from the neutral terminal C via the motor MO.

The switching elements Q11 to Q14, Q21 to Q24, and Q31 to Q34 that form the T-type neutral point clamped inverter 110a may employ an insulated gate bipolar transistor (IGBT) or a power field effect transistor (Power FET) for blocking or conducting a high voltage and a high current.

The 3-level inverter 110 is not limited to including the T-type neutral point clamped inverter 110a. For example, as illustrated in FIG. 8, the 3-level inverter 110 may include the diode clamped inverter 110b.

Three pairs of upper switching elements Q41 and Q42, Q51 and Q52, and Q61 and Q62 are provided between the positive DC terminal P and the three output terminals U, V, and W, and three pairs of lower switching elements Q43 and Q44, Q53 and Q54, and Q63 and Q64 are provided between the three output terminals U, V, and W, and the negative DC terminal N.

Three upper diodes D41, D51, and D61 are respectively provided between nodes at which the three pairs of upper switching elements Q41 and Q42, Q51 and Q52, and Q61 and Q62 are connected to each other and the neutral terminal C, and the three lower diodes D43, D53, and D63 are respectively provided between nodes at which the three pairs of lower switching elements Q43 and Q44, Q53 and Q54, and Q63 and Q64 are connected to each other and the neutral terminal C.

In addition, the three pairs of upper switching elements Q41 and Q42, Q51 and Q52, and Q61 and Q62 and the three pairs of lower switching elements Q43 and Q44, Q53 and Q54, and Q63 and Q64 may be opened and closed by the driving signal output from the driving circuit 140.

Hereinafter, the 3-level inverter 110 is assumed to include the T-type neutral point clamped inverter 110a to assist in understanding the disclosure.

The current detection unit 120 may include at least two current sensors. For example, the current detection unit 120 may include an a-phase current sensor 121 to detect an a-phase current supplied to the motor MO via the U-phase terminal, and a b-phase current sensor 123 to detect a b-phase current supplied to the motor MO via the V-phase terminal. Also, a c-phase current supplied to the motor MO via the W-phase terminal may be calculated by the control module 200 to be described below from the a-phase current and the b-phase current.

The current detection unit 120 is not limited to including the a-phase current sensor 121 and the b-phase current sensor 123. For example, the current detection unit 120 may include the b-phase current sensor to detect the b-phase current and a c-phase current sensor to detect c-phase current, or the current detection unit 120 may include the c-phase current sensor to detect the c-phase current and the a-phase current sensor to detect the a-phase current.

A high current of several amperes to hundreds of amperes (A) is supplied to the motor MO. To detect the high current, the at least two current sensors included in the current detection unit 120 may include a current transformer (CT) to proportionally decrease a level of the driving current and an ampere meter to detect the level of the proportionally decreased current. In other words, the at least two current sensors may detect the driving current by proportionally decreasing the level of the driving current using the CT and measuring the level of the proportionally decreased current.

Although the at least two sensors including the CT and the ampere meter are given as an example related to the current detection unit 120, embodiments are not limited thereto, and the current detection unit 120 may include a current sensor including a shunt resistor.

The voltage detection unit 130 may include a DC point voltage sensor 131 to detect a voltage between the positive DC terminal P and the negative DC terminal N, and a neutral point voltage sensor 133 to detect a neutral point voltage Vdcn between the neutral terminal C and the negative DC terminal N.

When the external power source ES is a three-phase power, the voltage between the positive DC terminal P and the negative DC terminal N becomes approximately 540 V. Also, the voltage between the neutral terminal C and the negative DC terminal N becomes approximately 270 V.

To detect the high voltage, the DC point voltage sensor 131 and the neutral point voltage sensor 133 may include a voltage distributor. Specifically, the DC point voltage sensor 131 may proportionally decrease the voltage between the positive DC terminal P and the negative DC terminal N using the voltage distributor, and measure the proportionally decreased voltage. Also, the neutral point voltage sensor 133 may proportionally decrease the voltage between the neutral terminal C and the negative DC terminal N using the voltage distributor, and measure the proportionally decreased voltage.

The driving circuit 140 provides the driving signal for opening and closing the plurality of switches Q11 to Q14, Q21 to Q24, and Q31 to Q34 included in the 3-level inverter 110 in accordance with the control signal of the control module 200 to be described below to the 3-level inverter 110.

Figure 9:
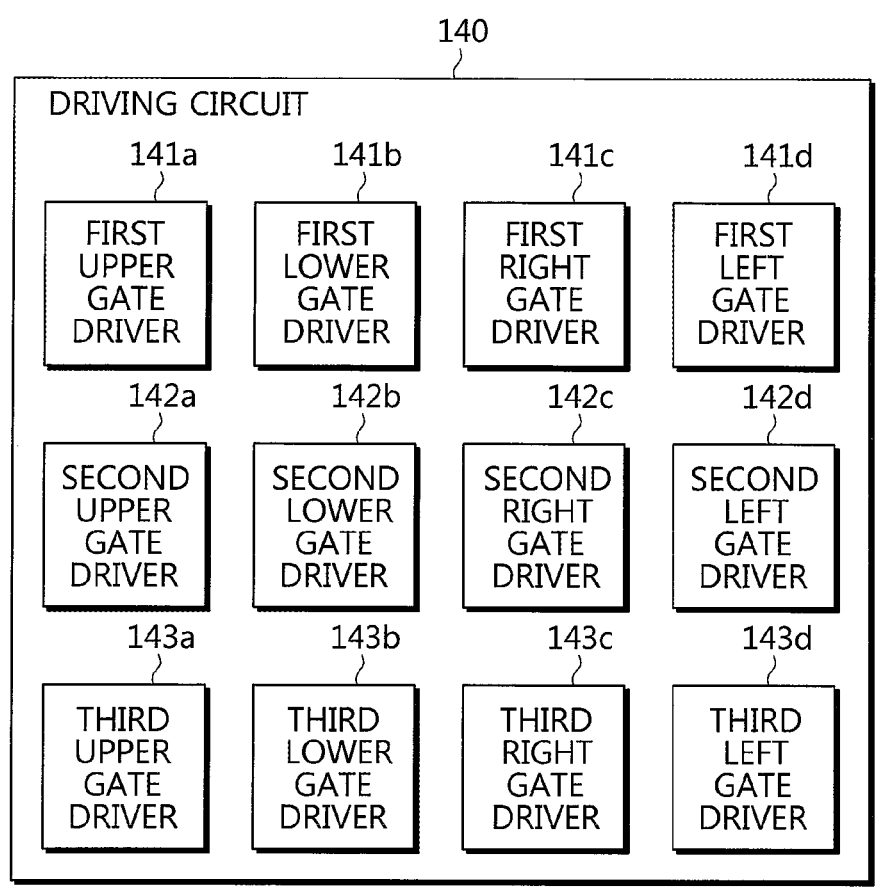
FIG. 9 illustrates a driving circuit included in the motor driving apparatus according to an embodiment.

For example, as illustrated in FIG. 9, the driving circuit 140 may include a plurality of gate drivers 141a to 141d, 142a to 142d, and 143a to 143d for respectively opening the plurality of switches Q11 to Q14, Q21 to Q24, and Q31 to Q34.

Specifically, the first upper gate driver 141a may generate a first upper switching signal to open and close the first upper switching element Q11, the first lower gate driver 141b may generate a first lower switching signal to open and close the first lower switching element Q12, the first right gate driver 141c may generate a first right switching signal to open and close the first right switching element Q13, and the first left gate driver 141d may generate a first left switching signal to open and close the first left switching element Q14.

In addition, the second upper gate driver 142a may generate a second upper switching signal to open and close the second upper switching element Q21, the second lower gate driver 142b may generate a second lower switching signal to open and close the second lower switching element Q22, the second right gate driver 142c may generate a second right switching signal to open and close the second right switching element Q23, and the second left gate driver 142d may generate a second left switching signal to open and close the second left switching element Q24.

In addition, the third upper gate driver 143a may generate a third upper switching signal to open and close the third upper switching element Q31, the third lower gate driver 143b may generate a third lower switching signal to open and close the third lower switching element Q32, the third right gate driver 143c may generate a third right switching signal to open and close the third right switching element Q33, and the third left gate driver 143d may generate a third left switching signal to open and close the third left switching element Q34.

The control module 200 generates the control signal for opening and closing the plurality of switches Q11 to Q14, Q21 to Q24, and Q31 to Q34 included in the 3-level inverter 110 according to an output of the current detection unit 120 and an output of the voltage detection unit 130, and provides the generated control signal to the driving circuit 140.

The configuration and operation of the control module 200 will be described in more detail below.

Figure 10:
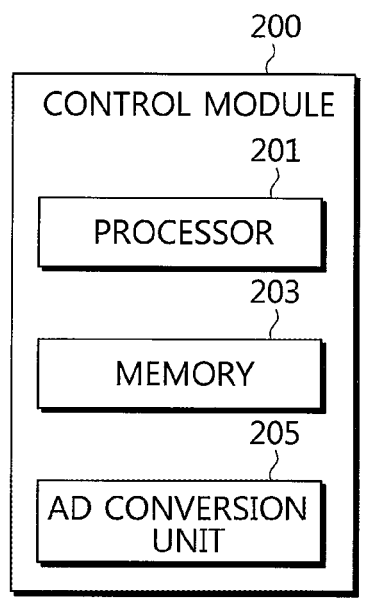
FIG. 10 illustrates a hardware configuration of a control module included in the motor driving apparatus according to an embodiment.
Figure 11:
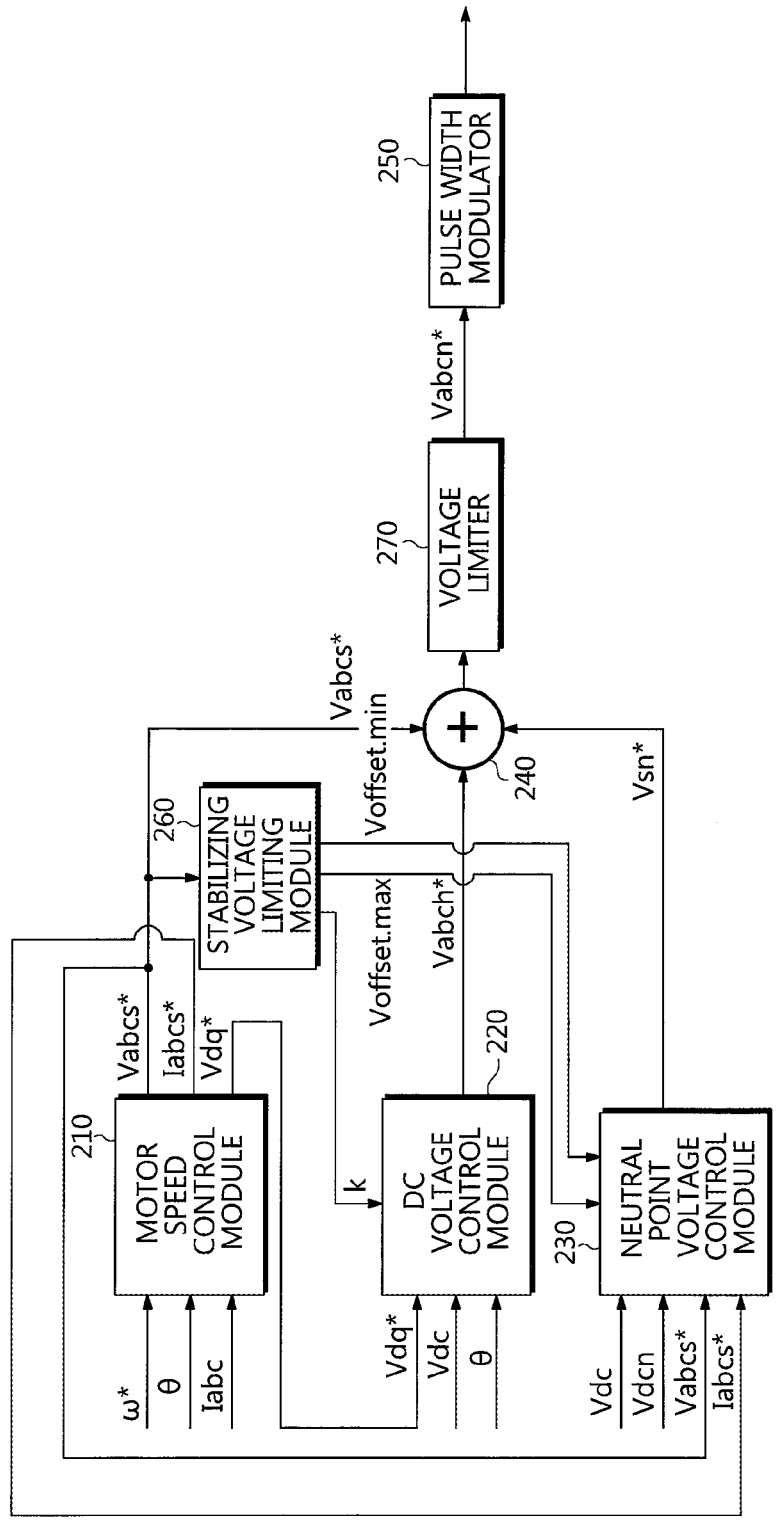
FIG. 11 illustrates a software configuration of the control module included in the motor driving apparatus according to an embodiment.

FIG. 10 illustrates a hardware configuration of a control module included in the motor driving apparatus according to an embodiment, and FIG. 11 illustrates a software configuration of the control module included in the motor driving apparatus according to an embodiment.

First, referring to FIG. 10, the control module 200 may include an analog-digital convertor (ADC) 205 to convert a driving current value detected by the current detection unit 120 and a DC voltage value detected by the voltage detection unit 130 into digital signals, a memory 203 to store programs and data for controlling the 3-level inverter 110, and a processor 201 to generate a control signal to control the 3-level inverter 110 according to the driving current value and the DC voltage value.

The ADC 205 converts the driving current value and the DC voltage value, which are analog signals, into digital signals that may be recognized by the processor 201.

The current detection unit 120 described above outputs an electrical signal of a level corresponding to the driving current value, and the voltage detection unit 130 also outputs an electrical signal of a level corresponding to the DC voltage value. The electrical signals output by the current detection unit 120 and the voltage detection unit 130 correspond to analog signals, and the processor 201 cannot process the analog signals. Due to this reason, the control module 200 may include the ADC 205 to convert the electrical signals output by the current detection unit 120 and the voltage detection unit 130 into digital signals.

The memory 203 may store control programs and control data for controlling an operation of the motor driving apparatus 1, or memorize the control signal output by the processor 201, the driving current value detected by the current detection unit 120, the DC voltage value detected by the voltage detection unit 130, and the like.

The memory 203 may include a volatile memory such as a static random access memory (S-RAM), and a dynamic RAM (D-RAM), and a nonvolatile memory such as a flash memory, a read-only memory (ROM), an erasable programmable ROM (EPROM), and an electrically erasable programmable ROM (EEPROM).

The nonvolatile memory may operate as an auxiliary memory device of the volatile memory, and store the control programs and the control data for controlling the operation of the motor driving apparatus 1. Also, the data stored in the nonvolatile memory is not lost even when a power of the motor driving apparatus 1 is turned off.

The volatile memory may load the control programs and the control data from the nonvolatile memory, or recall the control signal output by the processor 201, the driving current value detected by the current detection unit 120, and the DC voltage value detected by the voltage detection unit 130. Different from the nonvolatile memory, the data recalled in the volatile memory is lost when the motor driving apparatus 1 is turned off.

The processor 201 generates the control signal for controlling the 3-level inverter 110 according to the driving current value detected by the current detection unit 120, the DC voltage value detected by the voltage detection unit 130, and the programs and data stored in the memory 203.

Specifically, the processor 201 processes the driving current value detected by the current detection unit 120 and the DC voltage value detected by the voltage detection unit 130, and generates the control signal to control the 3-level inverter 110 such that the motor MO rotates by a target speed and the DC voltage and the neutral point voltage Vdcn are stabilized.

As described above, the control module 200 may include the ADC 205, the memory 203, and the processor 201 in terms of hardware.

In addition, the control module 200 may include various software modules in terms of software. As described above, the processor 201 may perform various processing functions for controlling the motor driving apparatus 1.

In addition, the control module 200 may be divided into a plurality of software modules in accordance with the various processing functions performed by the processor 201.

As illustrated in FIG. 11, the control module 200 may include a motor speed control module 210 to control a rotation speed of the motor MO, a DC voltage control module 220 to stabilize the DC voltage Vdc, a neutral point voltage control module 230 to stabilize the neutral point voltage Vdcn, a stabilizing voltage limiting module 260 to limit outputs of the DC voltage control module 220 and the neutral point voltage control module 230 in accordance with a capability curve of the motor driving apparatus 1, an adder 240 to synthesize outputs of the motor speed control module 210, the DC voltage control module 220, and the neutral point voltage control module 230, a voltage limiter 270 to limit an output of the adder 240, and a pulse width modulator 250 to modulate a pulse width of the output of the voltage limiter 270.

The motor speed control module 210 receives a speed reference ω* from an external device, receives a rotational displacement θ from the motor MO, receives a driving current Iabc from the current detection unit 120, and outputs a first voltage reference Vabcs*, a dq-axis voltage reference Vdq*, and a current reference Iabcs* for rotating the motor MO by a rotation speed corresponding to the speed reference ω*.

Here, the speed reference ω* may be received from an external device including the motor driving apparatus 1. For example, when the motor MO and the motor driving apparatus 1 are included in an air conditioner (not shown), a control apparatus (not shown) of the air conditioner may provide the speed reference ω* to the motor driving apparatus 1 such that the motor MO rotates by a target speed. In other words, the motor speed control module 210 may receive the speed reference ω* from products (e.g. an air conditioner, a refrigerator, and a vehicle) including the motor driving apparatus 1.

The stabilizing voltage limiting module 260 receives the first voltage reference Vabcs* from the motor speed control module 210, and outputs a value of k to limit an output of the DC voltage control module 220, and a maximum offset voltage Voffset.max and a minimum offset voltage Voffset.min to limit the output of the neutral point voltage control module 230. The k, the maximum offset voltage Voffset.max and the minimum offset voltage Voffset.min will be described in detail below.

The DC voltage control module 220 receives the dq-axis voltage reference Vdq* from the motor speed control module 210, receives the DC voltage Vdc from the voltage detection unit 130, receives the rotational displacement θ from the motor MO, and receives the value of k from the stabilizing voltage limiting module 260. Also, the DC voltage control module 220 outputs a second voltage reference Vabch* for stabilizing the DC voltage Vdc.

Here, the dq-axis voltage reference Vdq* is generated in a calculation process for the motor speed control module 210 to control the speed of the motor MO. The dq-axis voltage reference Vdq* will be described in detail below along with the motor speed control module 210.

The neutral point voltage control module 230 receives the first voltage reference Vabcs* from the motor speed control module 210, receives the DC voltage Vdc and the neutral point voltage Vdcn from the current detection unit 120, receives the current reference Iabcs* from the motor speed control module 210, and receives the maximum offset voltage Voffset.max and the minimum offset voltage Voffset.min from the stabilizing voltage limiting module 260. Also, the neutral point voltage control module 230 outputs a third voltage reference Vsn* for stabilizing the neutral point voltage Vdcn.

The adder 240 synthesizes the first voltage reference Vabcs* output by the motor speed control module 210, the second voltage reference Vabch* output by the DC voltage control module 220, and the third voltage reference Vsn* output by the neutral point voltage control module 230, and outputs a synthesized fourth voltage reference Vabcn*.

Here, the first voltage reference Vabcs* and the second voltage reference Vabch* are a-phase voltage, b-phase voltage, and c-phase voltage applied to the U-phase terminal U, V-phase terminal V, and W-phase terminal W of the motor MO, and the third voltage reference Vsn* is one voltage value.

Consequently, the adder 240 respectively adds an a-phase voltage, a b-phase voltage, and a c-phase voltage of the first voltage reference Vabcs* to an a-phase voltage, a b-phase voltage, and a c-phase voltage of the second voltage reference Vabch*, and adds the third voltage reference Vsn* to each of the sums of the first voltage reference Vabcs* and the second voltage reference Vabch*. In other words, the a-phase voltage of the first voltage reference Vabcs*, the a-phase voltage of the second voltage reference Vabch*, and the third voltage reference Vsn* are added, the b-phase voltage of the first voltage reference Vabcs*, the b-phase voltage of the second voltage reference Vabch*, and the third voltage reference Vsn* are added, and the c-phase voltage of the first voltage reference Vabcs*, the c-phase voltage of the second voltage reference Vabch*, and the third voltage reference Vsn* are added.

The voltage limiter 270 limits the fourth voltage reference Vabcn* output by the adder 240 using the DC voltage Vdc.

The DC-AC conversion unit 100 supplies the AC power to the motor MO using the DC power supplied from the DC link unit 6. Consequently, the AC power supplied to the motor MO by the DC-AC conversion unit 100 is limited by the DC power supplied from the DC link unit 6. Specifically, the driving voltage applied to the motor MO by the DC-AC conversion unit 100 cannot be higher than the DC voltage Vdc applied from the DC link unit 6.

Consequently, the voltage limiter 270 limits the fourth voltage reference Vabcn* using the DC voltage Vdc. For example, the voltage limiter 270 outputs the fourth voltage reference Vabcn* when the fourth voltage reference Vabcn* is equal to or lower than the DC voltage Vdc, and the voltage limiter 270 outputs the DC voltage Vdc when the fourth voltage reference Vabcn* is higher than the DC voltage Vdc.

The pulse width modulator 250 generates the control signal to be provided to the driving circuit 140 according to the output of the voltage limiter 270. Specifically, the pulse width modulator 250 outputs the control signal by modulating pulse widths of the a-phase, b-phase, c-phase voltages of the output of the voltage limiter 270.

The operations of the motor speed control module 210, the DC voltage control module 220, the neutral point voltage control module 230, and the stabilizing voltage limiting module 260 included in the control module 200 will be described in more detail below.

First, the motor speed control module 210 will be described.

Figure 12:
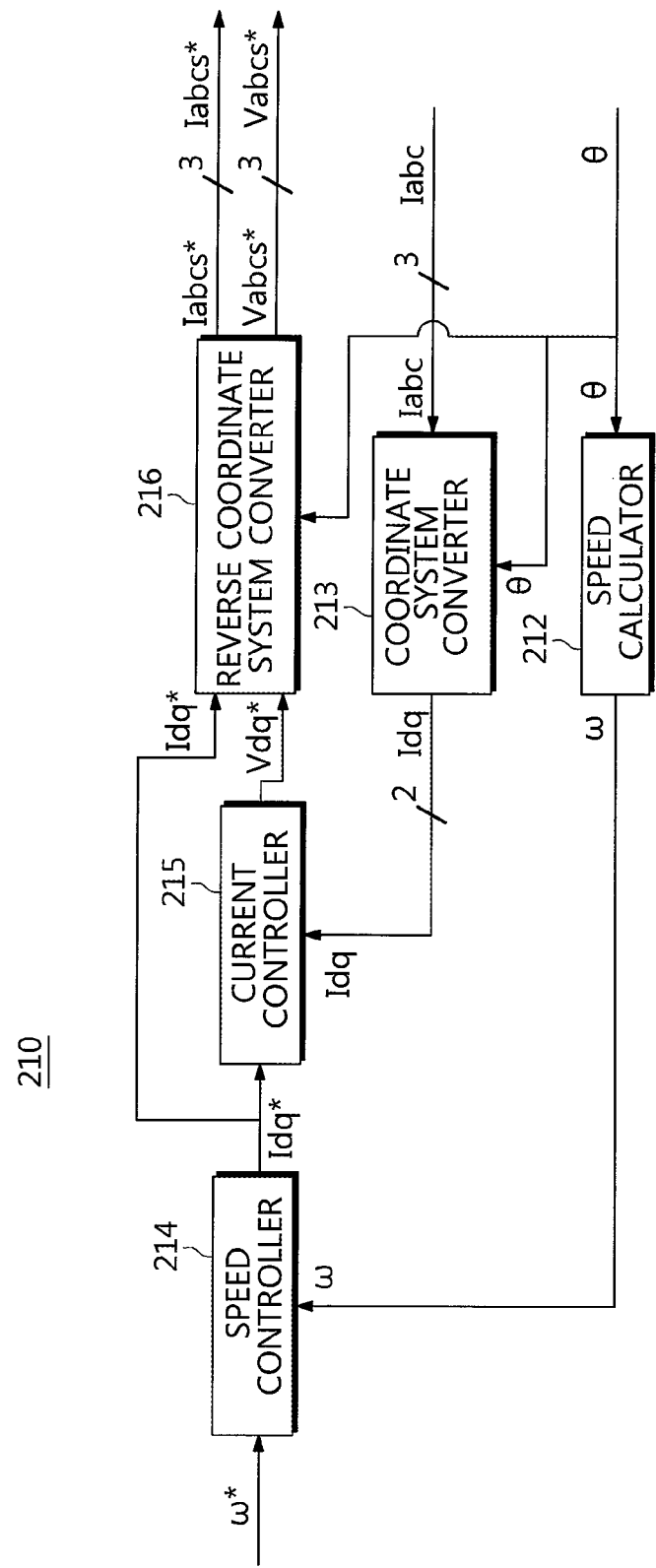
FIG. 12 illustrates configuration of a motor speed control module included in the motor driving apparatus according to an embodiment.

FIG. 12 illustrates a configuration of a motor speed control module included in the motor driving apparatus according to an embodiment.

Referring to FIG. 12, the motor speed control module 210 may include a speed calculator 212, a coordinate system converter 213, a speed controller 214, a current controller 215, and a reverse coordinate system converter 216.

The speed calculator 212 calculates a rotation speed ω of the motor MO from the rotational displacement θ of a rotor included in the motor MO. Here, as described above, the rotational displacement θ of the rotor may be received from a rotational displacement detection sensor such as the Hall sensor, the encoder, and the resolver included in the motor MO.

Furthermore, when the motor MO does not include the rotational displacement detection sensor, the speed calculator 212 may calculate the rotation speed ω of the motor MO from the driving current Iabc detected by the current detection unit 120. The calculating of the rotation speed of the motor MO using the driving current Iabc is referred to as 'sensorless control.'

Specifically, the speed calculator 212 may calculate the rotation speed ω of the motor MO by differentiating the rotational displacement θ of the rotor with respect to time. For example, when the speed calculator 212 receives the rotational displacement θ of the rotor every predetermined sampling period, the speed calculator 212 may calculate the rotation speed ω of the motor MO by dividing a difference between the rotational displacement θ of the rotor input in a previous sampling time and the currently input rotational displacement θ of the rotor by the sampling period.

The coordinate system converter 213 converts the three-phase driving current Iabc into the dq-axis current Idq according to the rotational displacement θ of the rotor.

Here, the d-axis refers to an axis along a direction corresponding to a direction of a magnetic field generated by the rotor of the motor MO, and the q-axis refers to an axis along a direction that has a 90° difference from the direction of the magnetic field generated by the rotor of the motor MO. Here, 90° does not refer to a mechanical angle of the rotor, but refers to an electrical angle resulting from converting an angle between abutting N-poles or an angle between abutting S-poles included in the rotor by 360°.

In addition, a d-axis current Id refers to a current component that generates a magnetic field along the d-axis direction of the three-phase driving current Iabc. As described above, the stator of the motor MO includes a plurality of coils, and the coils generate a magnetic field when a current is supplied to the coils. Here, a current component that generates a magnetic field along the d-axis direction of the current supplied to the coils becomes the d-axis current Id.

In addition, a q-axis current Iq refers to a current component that generates a magnetic field along the q-axis direction of the three-phase driving current Iabc. In other words, a current component that generates a magnetic field along the q-axis direction of the current supplied to the coils becomes the q-axis current Iq.

The coordinate system converter 213 may calculate the dq-axis current Idq from the three-phase driving current Iabc using [Equation 1].

$$\begin{bmatrix} I_d \\ I_q \end{bmatrix} = \begin{bmatrix} \cos\theta & \sin\theta \\ -\sin\theta & \cos\theta \end{bmatrix} \begin{bmatrix} 1 & 0 & 0 \\ 0 & 1/\sqrt{3} & -1/\sqrt{3} \end{bmatrix} \begin{bmatrix} I_a \\ I_b \\ I_c \end{bmatrix} \quad \text{[Equation 1]}$$

(Here, Id represents a d-axis current, Iq represents a q-axis current, θ represents a rotational displacement of a rotor, Ia represents an a-phase current, Ib represents a b-phase current, and Ic represents a c-phase current.)

The speed controller 214 compares the speed reference ω* input from the outside with the rotation speed ω of the motor MO, and outputs the dq-axis current reference Idq* in accordance with a result of the comparison. Specifically, the speed controller 214 may output the dq-axis current to be supplied to the motor MO in order to decrease a difference between the speed reference ω* and the rotation speed ω.

The q-axis current reference Iq* is directly related to a rotary force (torque) generated by the motor MO. In other words, the rotary force generated by the motor MO increases as the q-axis current reference Iq* increases. Also, the d-axis current reference Id* is a component that is irrelevant to the rotary force (torque) generated by the motor MO. However, the driving voltage Vabc applied to the motor MO may change by the d-axis current reference Id*. The speed controller 214 may output the d-axis current reference Id* as "0" in order to decrease energy loss.

Here, a counter electromotive force increases as the rotation speed of the motor MO increases, and the driving voltage Vabc applied to the motor MO also increases as the counter electromotive force increases. Here, the driving voltage Vabc is limited by the DC voltage Vdc applied from the DC link unit 6. That is, the driving voltage Vabc cannot be higher than the DC voltage Vdc.

While the driving voltage Vabc is being limited by the DC voltage Vdc, the speed controller 214 may output a negative d-axis current reference Id* for the motor MO to generate a greater rotary force. When the speed controller 214 outputs the negative d-axis current reference Id*, the driving voltage Vabc may be decreased.

The outputting of the negative d-axis current reference Id* by the speed controller 214 in a rapid rotation range of the motor MO is generally referred to as "weak magnetic flux control."

The speed controller 214 may include at least one of a proportional controller, a proportional integral controller, and a proportional integral and differential controller.

The current controller 215 compares the dq-axis current reference Idq* output by the speed controller 214 with the dq-axis current Idq of the motor MO, and outputs the dq-axis voltage reference Vdq* in accordance with a result of the comparison. Specifically, the current controller 215 outputs the dq-axis voltage to be applied to the motor MO in order to decrease a difference between the dq-axis current reference Idq* and the dq-axis driving current Idq.

Here, the dq-axis current Idq is the dq-axis current Idq output by the coordinate system converter 213 described above. Also, the dq-axis voltage reference Vdq* refers to a voltage corresponding to the dq-axis current reference Idq*. In other words, the dq-axis voltage reference Vdq* refers to a dq-axis voltage that should be applied to the motor MO in order to supply the dq-axis current command Idq* to the motor MO.

The current controller 215 may include at least one of a proportional controller, a proportional integral controller, and a proportional integral and differential controller.

The reverse coordinate system converter 216 converts the dq-axis voltage reference Vdq* into the first voltage reference Vabcs* in accordance with the rotational displacement θ of the rotor.

The dq-axis voltage reference Vdq* refers to a dq-axis voltage that should be applied to the motor MO in order to supply the dq-axis current reference Idq* to the motor MO as described above.

The reverse coordinate system converter 216 may calculate the first voltage reference Vabcs* from the dq-axis voltage Vdq using [Equation 2]. Specifically, the reverse coordinate system converter 216 outputs a driving voltage that should be actually applied to the U-phase terminal U, the V-phase terminal V, and the W-phase terminal W of the motor M for the dq-axis voltage reference Vdq* to be applied to the motor MO.

$$\begin{bmatrix} V_a \\ V_b \\ V_c \end{bmatrix} = \begin{bmatrix} 1 & 0 \\ -1/2 & \sqrt{3}/2 \\ -1/2 & -\sqrt{3}/2 \end{bmatrix} \begin{bmatrix} \cos\theta & -\sin\theta \\ \sin\theta & \cos\theta \end{bmatrix} \begin{bmatrix} V_d \\ V_q \end{bmatrix}. \quad \text{[Equation 2]}$$

(Here, Vd represents d-axis voltage, Vq represents q-axis voltage, θ represents a rotational displacement of a rotor, Va represents an a-phase voltage, Vb represents a b-phase voltage, and Vc represents a c-phase voltage.)

In addition, the reverse coordinate system converter 216 calculates the current reference Iabcs* from the dq-axis current Idq. Specifically, the reverse coordinate system converter 216 may calculate the current reference Iabcs* from the dq-axis Idq using a relation of [Equation 2].

In this way, the motor speed control module 210 outputs the first voltage reference Vabcs* for rotating the motor MO by the speed of the speed reference ω* to the adder 240 according to the driving current Iabc supplied to each of the phases of the motor MO and the speed reference ω* input from the external device. Also, the motor speed control module 210 outputs the dq-axis voltage reference Vdq* to the DC voltage control module 220 to be described below.

Next, the DC voltage control module 220 will be described.

Figure 13:
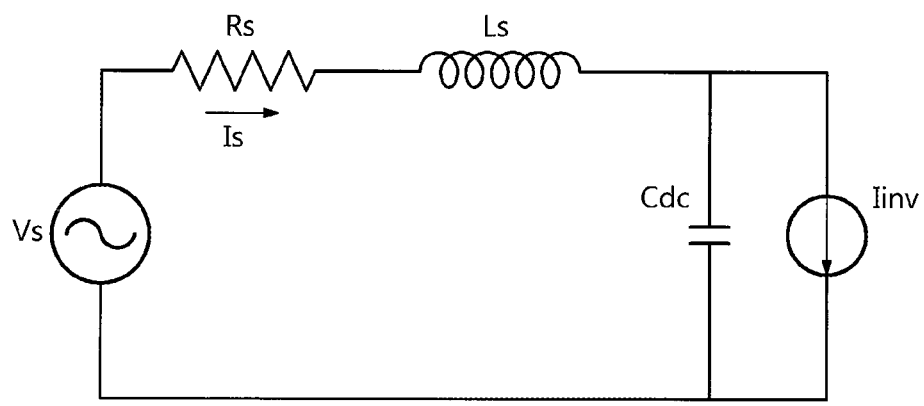
FIG. 13 is an equivalent circuit simply modeling an external power source, the motor driving apparatus, and a motor.
Figure 13:
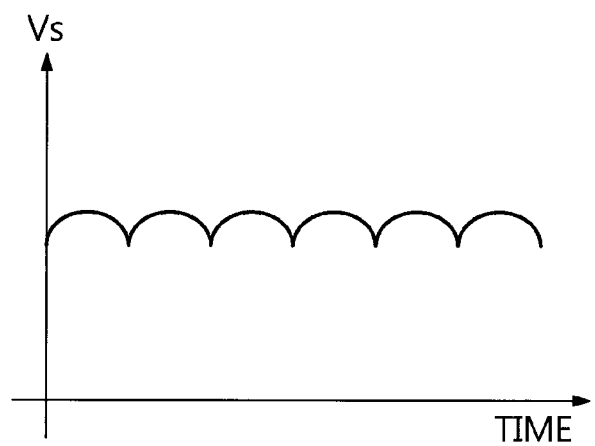
Figure 14:
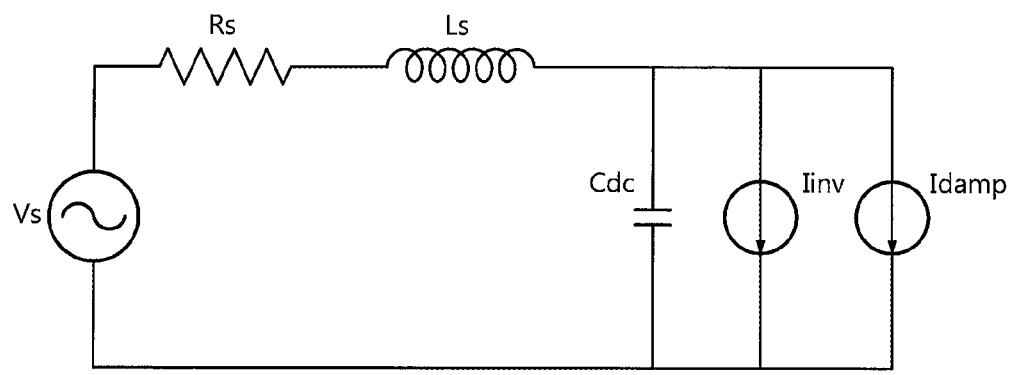
FIG. 14 is an equivalent circuit including a damping current source for preventing divergence of a DC voltage.
Figure 15:
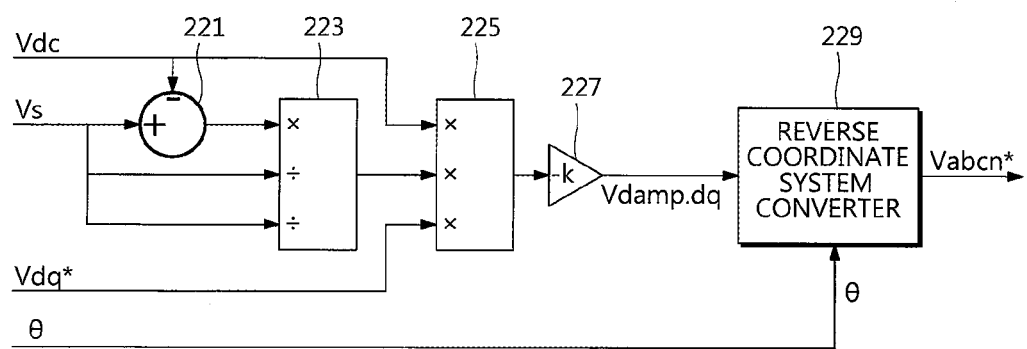
FIG. 15 illustrates a configuration of a DC voltage control module included in the motor driving apparatus according to an embodiment.

FIG. 13 is an equivalent circuit simply modeling an external power source, the motor driving apparatus, and a motor, FIG. 14 is an equivalent circuit including a damping current source for preventing divergence of a DC voltage, and FIG. 15 illustrates a configuration of a DC voltage control module included in the motor driving apparatus according to an embodiment.

First, pulsation of the DC voltage Vdc will be described with reference to FIG. 13.

As illustrated in (a) of FIG. 13, the external power source ES may be simply modeled using an equivalent voltage source Vs, an equivalent resistor Rs, and an equivalent inductor Ls, the DC link unit 6 may be simply modeled using an equivalent capacitor Cdc, and the motor MO and the DC-AC conversion unit 100 may be simply modeled using a current source Iinv.

Here, the equivalent voltage source Vs applies a voltage as illustrated in (b) of FIG. 13 to the equivalent capacitor Cdc. Specifically, the equivalent voltage source Vs applies a voltage in a form of the three-phase AC voltage rectified by the rectifying circuit 3 to the equivalent capacitor Cdc. However, it is not possible to measure the voltage output by the equivalent voltage source Vs using the equivalent inductor Ls and the equivalent capacitor Cdc.

Due to this reason, hereinafter, it is assumed that the voltage output by the equivalent voltage source Vs is an average value of voltages applied from the external power source ES.

In addition, the equivalent inductor Ls represents an inductance inside the external power source ES, and the equivalent resistor Rs represents a resistance by a power line, and the like.

In addition, the equivalent capacitor Cdc of the motor driving apparatus 1 represents the film capacitors C7a and C7b included in the DC link unit 6 of the motor driving apparatus 1.

As illustrated in (a) of FIG. 13, equivalent circuits of the external power source ES, the motor driving apparatus 1, and the motor MO include the equivalent inductor Ls of the external power source ES and the equivalent capacitor Cdc of the motor driving apparatus 1. As a result, a resonance phenomenon occurs between the equivalent inductor Ls and the equivalent capacitor Cdc, and destabilizes a voltage between both ends of the equivalent capacitor Cdc.

The resonance phenomenon will be mathematically examined.

The equivalent circuit illustrated in (a) of FIG. 13 may be expressed by [Equation 3] and [Equation 4].

$$\frac{d}{dt}V_{dc} = \frac{1}{C_{dc}}(I_s - I_{inv}) \quad \text{[Equation 3]}$$

(Here, Vdc represents the DC voltage, Cdc represents a capacitance of the equivalent capacitor, Is represents a supplied current supplied from the voltage source, and Iinv represents a driving current supplied to the motor.)

$$\frac{d}{dt}I_s = \frac{1}{L_s}(V_s - V_{dc} - R_s I_s) \quad \text{[Equation 4]}$$

(Here, Is represents a supplied current supplied from the voltage source, Ls represents an inductance of the equivalent inductor, Vs represents a voltage source voltage applied from the voltage source, Vdc represents the DC voltage, and Rs represents the resistive value of the equivalent resistor.)

In addition, when the DC voltage (Vdc) changes, a small signal analysis may be performed in order to analyze the stability of the voltage.

A small signal analysis of the circuit in (a) of FIG. 13 is the same as the following [Equation 5].

$$\begin{aligned} I_{inv} &= P_{inv}/V_{dc} \quad \text{[Equation 5]} \\ &= P_{inv}/V_{dc}(0) + P_{inv}/V_{dc}(0)^2(V_{dc}(0) - V_{dc}) \end{aligned}$$

-continued $$= I_{inv}(0) + \Delta V_{dc} / R_{inv}$$

$$= 2I_{inv}(0) - V_{dc} / R_{inv}$$

(Here, Iinv represents an equivalent driving current supplied to the motor, Pinv represents a consumed power of the motor, Vdc represents a DC voltage including a ripple, Vdc(0) represents a DC component of the DC voltage, Rinv represents the equivalent resistor of the motor, and Iinv(0) represents a driving current due to the DC component of the C voltage).

A result of substituting [Equation 5] into [Equation 3] is the following [Equation 6].

$$\frac{d}{dt}V_{dc} = 1/C_{dc}(I_s - I_{inv}) \quad \text{[Equation 6]}$$

$$= 1/C_{dc}(I_s - P_{inv}/V_{dc}(0) +$$

$$P_{inv}/V_{dc}(0)^2(V_{dc}(0) - V_{dc}))$$

(Here, Vdc represents an equivalent driving voltage including a ripple, Cdc represents a capacitance of the equivalent capacitor, Is represents a current supplied from the equivalent voltage source, Iinv represents a driving current supplied to the motor, and Rinv represents the equivalent resistor of the motor.)

According to [Equation 6], a differential value of the DC voltage Vdc is proportional to the DC voltage Vdc. As a result, a value of the differential equation shown in [Equation 6] has a form of an exponential function such that the DC voltage Vdc gradually increases in accordance with time. That is, the DC voltage Vdc is diverged instead of being stabilized.

To prevent the divergence of the DC voltage Vdc, a damping current source Idamp may be provided as illustrated in FIG. 14.

To prevent the divergence of the DC voltage Vdc according to [Equation 6], a damping current of the damping current source Idamp may be set as [Equation 7].

$$I_{damp} = -k\frac{P_{inv}}{V_{dc}(0)^2}(V_{dc}(0) - V_{dc}) \quad \text{[Equation 7]}$$

(Here, Idamp represents a damping current of the damping current source, k represents any constant greater than 1, Pinv represents the consumed power of the motor, Vdc represents the DC voltage including a ripple, and Vdc(0) represents a DC component of the DC voltage.)

A small signal analysis of the circuit of FIG. 14 based on [Equation 7] is as the following [Equation 8].

$$I_{inv} = P_{inv}/V_{dc} + I_{damp} \quad \text{[Equation 8]}$$

$$= P_{inv}/V_{dc}(0) + P_{inv}/V_{dc}(0)^2(V_{dc}(0) - V_{dc}) -$$

$$k\frac{P_{inv}}{V_{dc}(0)^2}(V_{dc}(0) - V_{dc})$$

$$= I_{inv}(0) + (1+k)\Delta V_{dc}/R_{inv}$$

$$= (2-k)I_{inv}(0) + (-1+k)V_{dc}/R_{inv}$$

(Here, Iinv represents an equivalent driving current supplied to the motor, Pinv represents a consumed power of the motor, Vdc represents the DC voltage including a ripple, Vdc(0) represents a DC component of the DC voltage, k represents any constant greater than 1, Rinv represents the equivalent resistor of the motor, and Iinv(0) represents a driving current due to the DC component of the DC voltage.)

A result of substituting [Equation 8] into [Equation 3] is the same as the following [Equation 9].

$$\frac{d}{dt}V_{dc} = 1/C_{dc}(I_s - I_{inv}) \quad \text{[Equation 9]}$$

$$= 1/C_{dc}[I_s - (2-k)I_{inv}(0) -$$

$$(-1+k)V_{dc}/R_{inv}]$$

(Here, Vdc represents the DC voltage including a ripple, Cdc represents the capacitance of the equivalent capacitor, Is represents a current supplied from the voltage source, Iinv represents a driving current supplied to the motor, Rinv represents the equivalent resistor of the motor, K represents any constant greater than 1, and Iinv(0) represents a driving current due to the DC component of the DC voltage.)

According to [Equation 9], the DC voltage Vdc does not diverge and converges to a certain value when the value of k is greater than 1. Also, the DC voltage Vdc is more stabilized as the value of k is greater.

Here, the value of k may be received from the stabilizing voltage limiting module 260 as described above.

The DC voltage control module 220 may output the voltage reference Vabch* corresponding to the damping current Idamp in order to stabilize the DC voltage Vdc.

The damping voltage Vdamp corresponding to the damping current Idamp may be calculated using [Equation 7], [Equation 10], and [Equation 11].

$$\frac{3}{2}(V_{damp,d}I_d + V_{damp,q}I_q) = V_{dc}I_{damp} \quad \text{[Equation 10]}$$

(Here, Vdamp,d represents a d-axis damping voltage reference, Id represents a d-axis current reference, Vdamp,q represents a q-axis damping voltage reference, and Iq represents a q-axis current reference.)

$$P_{inv} = V_{dc}I_{inv} = \frac{3}{2}(V_dI_d + V_qI_q) \quad \text{[Equation 11]}$$

(Here, Pinv represents a consumed power of the motor, Vdc represents the DV voltage, Iinv represents a driving current supplied to the motor, Id represents a d-axis current reference, Iq represents a q-axis current reference, Vd represents a d-axis voltage reference, and Vq represents a q-axis voltage reference.)

When [Equation 10] is simplified, and [Equation 7] and [Equation 11] are substituted thereinto, a result is the same as the following [Equation 12].

$$V_{damp,dq} = \frac{2}{3}\frac{V_{dc}I_{damp}}{I_{dq}} \quad \text{[Equation 12]}$$

-continued $$= -k \frac{V_{dc} V_{dq}}{V_{dc}(0)^2} (V_{dc}(0) - V_{dc})$$

$$= -k \frac{V_{dc} V_{dq}}{V_s^2} (V_s - V_{dc})$$

(Here, Vdamp,dq represents a dq-axis damping voltage reference, Idq represents a dq-axis current reference, Vdc represents the DC voltage, Vdc(0) represents a DC component of the DC voltage, Vs represents a voltage of the voltage source, and k represents any constant greater than 1.)

According to [Equation 12], the dq-axis damping voltage Vdamp,dq for stabilizing the DC voltage Vdc is proportional to the k. That is, a level of the damping voltage Vdamp,dq for stabilizing the DC voltage Vdc increases and the pulsation of the DC voltage Vdc decreases as the value of k increases.

In addition, an output voltage of the equivalent voltage source Vs should be calculated in order to calculate the dq-axis damping voltage reference Vdamp,dq.

The voltage of the equivalent voltage source Vs may be calculated from [Equation 3] and [Equation 4]. In other words, the output voltage of the equivalent voltage source Vs may be estimated using the equivalent driving current Iinv and the DC voltage Vdc supplied to the motor MO. Furthermore, the voltage of the equivalent voltage source Vs may be given by a designer in accordance with an output voltage of the external power source ES and a rated current of the motor MO. For example, the voltage of the equivalent voltage source Vs may be set as an average value of the voltages applied from the external power source ES. Hereinafter, the voltage of the equivalent voltage source Vs is assumed to be the average value of the voltages applied from the external power source ES to assist in understanding the disclosure.

In addition, when the dq-axis damping voltage reference Vdamp,dq is converted to reverse coordinates, the second voltage reference Vabch* is calculated. In other words, when the dq-axis damping voltage reference Vdamp,dq of the dq-axis coordinate system is converted to abc phases, the second voltage reference Vabch* is acquired.

Based on the theories described above, the DC voltage control module 220 may calculate the dq-axis damping voltage reference Vdamp,dq using [Equation 12], and may calculate the second voltage reference Vabch* from the dq-axis damping voltage reference Vdamp,dq.

Specifically, the DC voltage control module 220 may include a subtractor 221, a divider 223, a multiplier 225, an amplifier 227, and a reverse coordinate system converter 229 as illustrated in FIG. 15.

The subtractor 221 calculates a difference between the voltage source voltage Vs and the DC voltage Vdc, and the divider 223 calculates a value resulting from dividing the difference between the voltage source voltage Vs and the DC voltage Vdc by a square of the voltage source voltage Vs. Also, the multiplier 225 calculates a multiplication of an output of the divider 223, the DC voltage Vdc, and the dq-axis voltage reference Vdq, and the amplifier 227 amplifies the output of the multiplier 225 by '−k' times.

[Equation 12] is implemented by the subtractor 221, the divider 223, the multiplier 225, and the amplifier 227. As a result, an output of the amplifier 227 is the same as the dq-axis damping voltage reference Vdamp,dq.

The reverse coordinate system converter 229 converts the dq-axis damping voltage reference Vdamp,dq into the second voltage reference Vabch* in accordance with the rotational displacement θ of the rotor. As described above, the DC voltage control module 220 may calculate the damping voltage Vdamp,dq that stabilizes the DC voltage Vdc from the DC voltage Vdc, the dq-axis current reference Idq*, and the k, i.e. the second voltage reference Vabch*).

Next, the neutral point voltage control module 230 will be described.

Figure 16:
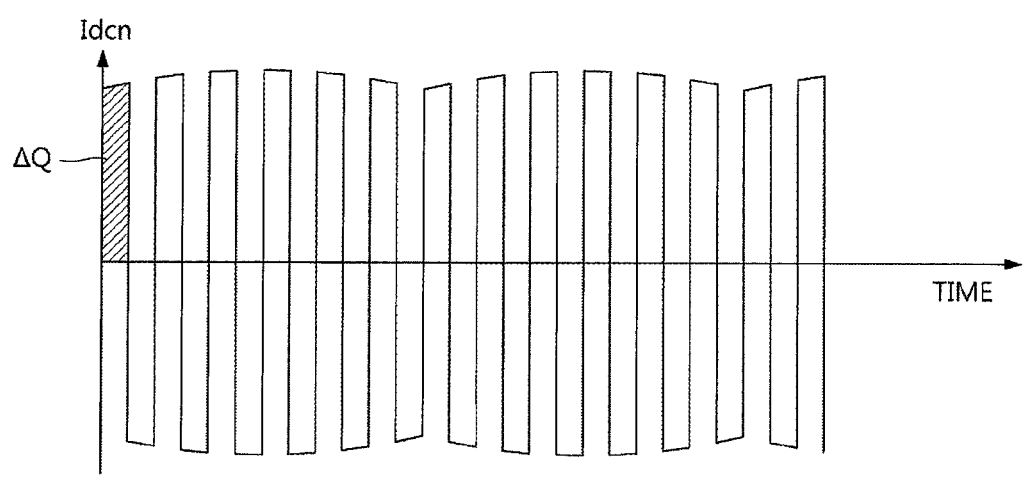
FIG. 16 illustrates a current flowing in a neutral point of the DC link unit included in the motor driving apparatus according to an embodiment.
Figure 17:
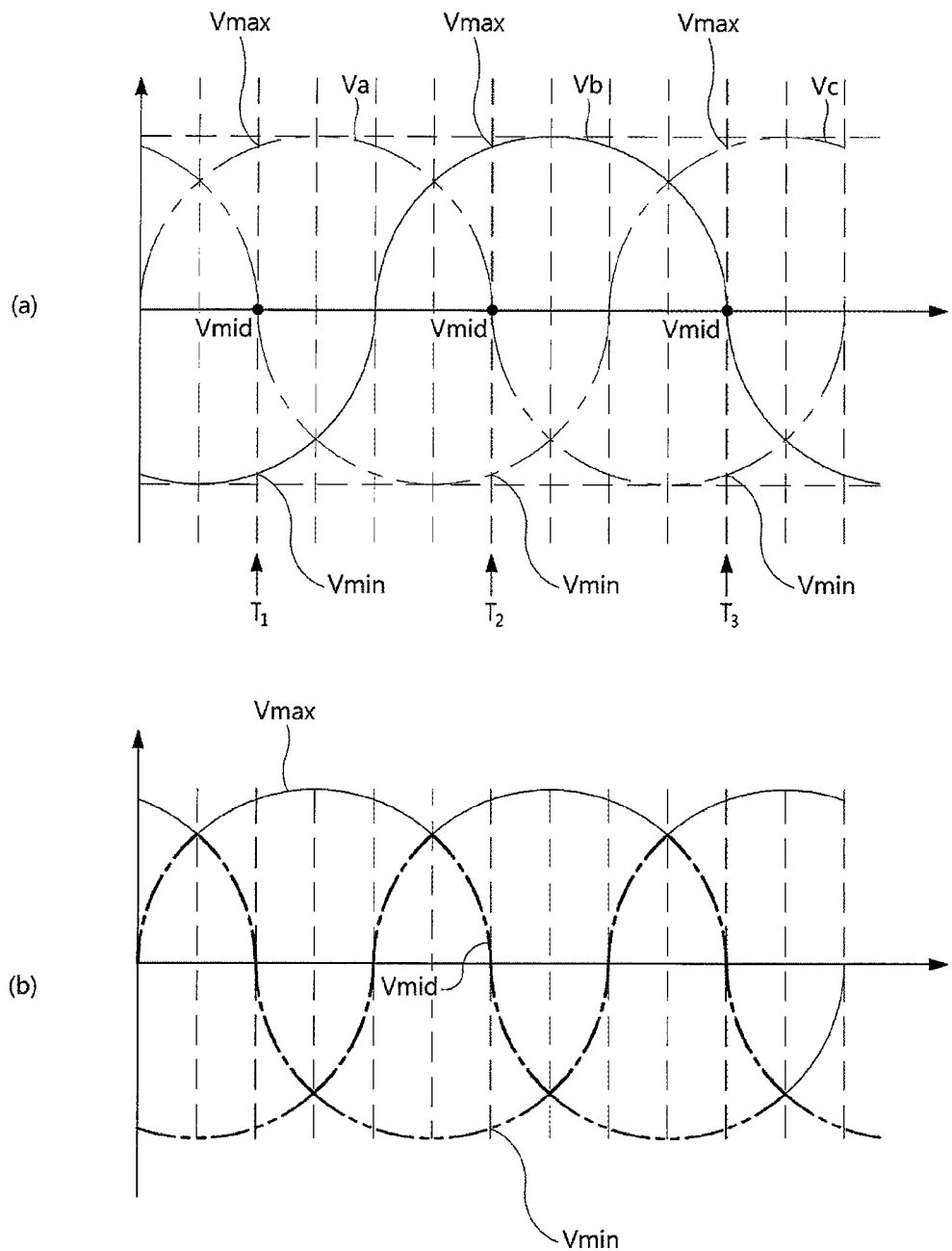
FIG. 17 illustrates a phase voltage output by the motor driving apparatus according to an embodiment.
Figure 18:
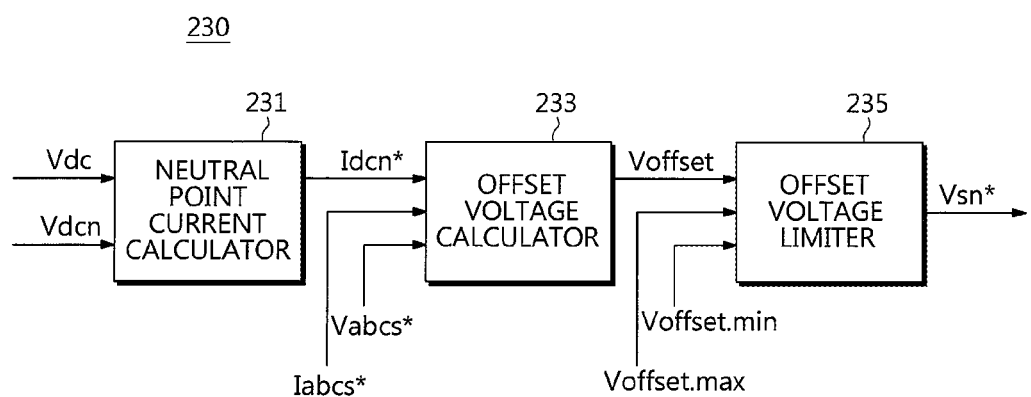
FIG. 18 illustrates a configuration of a neutral point voltage control module included in the motor driving apparatus according to an embodiment.

FIG. 16 illustrates a current flowing in a neutral point of the DC link unit included in the motor driving apparatus according to an embodiment, and FIG. 17 illustrates a phase voltage output by the motor driving apparatus according to an embodiment. Also, FIG. 18 illustrates a configuration of a neutral point voltage control module included in the motor driving apparatus according to an embodiment.

As described above, the current flows to the second neutral point terminal C of the DC link unit 6 or flows out from the second neutral point terminal C of the DC link unit 5 in accordance with an operation of the 3-level inverter 110.

For example, when the first upper switching element Q11 and the second left switching element Q24 of the 3-level inverter 110 are closed, the driving current may flow to the motor MO from the positive DC terminal P via the first upper switching element Q11 and the U-phase terminal U, and flow to the neutral terminal C from the motor MO via the V-phase terminal V and the second left switching element Q24.

In another example, when the first right switching element Q13 and the second lower switching element Q22 are closed, the driving current may flow to the motor MO from the neutral terminal C via the first right switching element Q13 and the U-phase terminal U, and flow to the negative DC terminal N from the motor MO via the V-phase terminal V and the second lower switching element Q22.

Specifically, the current flowing to the neutral terminal C has a step form wave as illustrated in FIG. 16. In other words, the current periodically flows into and flows out from the neutral terminal C in order to drive the motor MO.

Since the upper capacitor C7a and the lower capacitor C7b are connected via the neutral terminal C, a charge amount stored in the upper capacitor C7a and the lower capacitor C7b changes and a voltage between both ends of the upper capacitor C7a and a voltage between both ends of the lower capacitor C7b also change in accordance with the current flowing to the neutral terminal C.

For example, when the current flows to the neutral terminal C from the positive DC terminal P via the motor MO, the charge amount stored in the upper capacitor C7a decreases, and the charge amount stored in the lower capacitor C7b increases. In other words, when the neutral point current Idcn flowing to the neutral terminal C increases, a difference ΔQ of the charge amounts is generated between the upper capacitor C7a and the lower capacitor C7b as illustrated in FIG. 16. The charge amount stored in the lower capacitor C7b becomes greater than the charge amount stored in the upper capacitor C7a by ΔQ.

The difference ΔQ of the charge amounts causes a difference ΔVdc between the voltage between both ends of the upper capacitor C7a and the voltage between both ends of the lower capacitor C7b. In other words, a voltage VdcL between both ends of the lower capacitor C7b becomes greater than a voltage VdcH between both ends of the upper capacitor C7a by ΔVdc.

In addition, when the current flows to the negative DC terminal N from the neutral terminal C via the motor MO, a phenomenon opposite from that described above occurs. In other words, when the neutral point current Idcn flowing to the neutral terminal C increases in a negative direction, the charge amount stored in the upper capacitor C7a becomes greater than the charge amount stored in the lower capacitor C7b by ΔQ. Also, the voltage VdcH between both ends of the upper capacitor C7a becomes greater than the voltage VdcL between both ends of the lower capacitor C7b by ΔVdc.

In this way, the neutral point voltage Vdcn is not stabilized and vibrates due to the neutral point current Idcn.

Particularly, when a low-capacity film capacitor is used as the upper capacitor C7a and the lower capacitor C7b, an amplitude of a vibration of the neutral point voltage Vdcn caused by the neutral point current Idcn may further increase.

As a result, not only it is difficult to stably control the rotation speed of the motor MO, but the switching elements Q11 to Q14, Q21 to Q24, and Q31 to Q34 included in the 3-level inverter 110 may be damaged.

The vibration of the neutral point vibration Vdcn will be examined.

A change of the neutral point voltage Vdcn caused by the neutral point current Idcn may be expressed by [Equation 13].

$$\Delta V_{dcH} = \frac{1}{C_{dc}} \int_0^t I_{dcH}\, dt \qquad \text{[Equation 13]}$$

$$\Delta V_{dcL} = \frac{1}{C_{dc}} \int_0^t I_{dcL}\, dt$$

$$\Delta V_{dcn} = (\Delta V_{dcH} - \Delta V_{dcL}) =$$

$$\frac{1}{C_{dc}} \int_0^t (I_{dcH} - I_{dcL})\, dt = \frac{1}{C_{dc}} \int_0^t I_{dcn}\, dt$$

(Here, ΔVdcH represents a change in a voltage of the upper capacitor, Cdc represents capacitances of the upper and lower capacitors, IdcH represents a current flowing to the upper capacitor, ΔVdcL represents a change in a voltage of the lower capacitor, IdcL represents a current flowing to the lower capacitor, ΔVdcn represents a change in a neutral point voltage, and Idcn represents a neutral point current.)

According to [Equation 13], the change in the neutral point voltage ΔVdcn is determined by the neutral point current Idcn.

In addition, the neutral point current Idcn during on/off periods of the neutral switching elements Q14, Q13, Q24, Q23, Q34, and Q33 included in the 3-level inverter 110 may be expressed by [Equation 14].

$$I_{dcn} = \sum_{x=a,b,c} T_{xn}/T_{sw} I_x \qquad \text{[Equation 14]}$$

(Here, Idcn represents the neutral point current, Txn represents an on-time of the neutral point switch, Tsw represents an on/off period of a switch, and Ix represents a phase current.)

If the neutral point voltage Vdcn is maintained as half of the DC voltage Vdc, [Equation 14] may be expressed as [Equation 15].

$$I_{dcn} = \sum_{x=a,b,c} \left[1 - \left|\frac{V_x}{V_{dc}/2}\right|\right] I_x = \qquad \text{[Equation 15]}$$

-continued
$$-\sum_{x=a,b,c} \left|\frac{V_x}{V_{dc}/2}\right| I_x = -\sum_{x=a,b,c} |V_{x,norm}| I_x$$

(Here, Idcn represents the neutral point current, Vx represents a phase voltage, Ix represents the phase current, Vdc represents the DC voltage, and Vx,norm represents a normalized phase voltage.)

According to [Equation 15], the neutral point current Idcn is determined by the phase voltages Va, Vb, and Vc and the phase currents Ia, Ib, and Ic. Also, the normalized phase voltage Vx,norm in [Equation 15] may have a value between −1 and +1. The normalized phase voltage Vx,norm represents a ratio of the phase voltages Va, Vb, and Vc with respect to half the DC voltage Vdc.

Here, the phase currents Ia, Ib, and Ic are important factors related to the torque of the motor MO, and are controlled by the motor speed control module 210 described above. Consequently, it is difficult for the neutral point voltage control module 230 to control the phase currents Ia, Ib, and Ic.

The phase voltages Va, Vb, and Vc are related to the phase currents Ia, Ib, and Ic. Specifically, the phase currents Ia, Ib, and Ic change due to differences among the phase voltages Va, Vb, and Vc.

If the phase voltages Va, Vb, and Vc are changed while constantly maintaining the differences among the phase voltages Va, Vb, and Vc, the phase currents Ia, Ib, and Ic are not changed. In other words, when all of the phase voltages Va, Vb, and Vc are changed by the same level, the phase currents Ia, Ib, and Ic may not be changed.

Due to this reason, the phase voltages Va, Vb, and Vc may be changed by adding the offset voltage Voffset to all of the phase voltages Va, Vb, and Vc, and here, the phase currents Ia, Ib, and Ic are not changed.

Consequently, when the offset voltage Voffset is added to all of the phase voltages Va, Vb, and Vc and the offset voltage Voffset is controlled, the neutral point current Idcn and the neutral point voltage Vdcn may be controlled.

As described above, according to [Equation 15], the neutral point current Idcn is determined by products of the phase voltages Va, Vb, and Vc and the phase currents Ia, Ib, and Ic.

In addition, the phase voltages Va, Vb, and Vc and the phase currents Ia, Ib, and Ic have a sine waveform. Here, a maximum voltage Vmax, a middle voltage Vmid, and a minimum voltage Vmin may be set at each of sampling times T1, T2, and T3.

For example, as illustrated in (a) of FIG. 17, the a-phase voltage Va becomes the maximum voltage Vmax, the c-phase voltage Vc becomes the middle voltage Vmid, and the b-phase voltage Vb becomes the minimum voltage Vmin at the first sampling time T1. Also, the b-phase voltage Vb becomes the maximum voltage Vmax, the a-phase voltage Va becomes the middle voltage Vmid, and the c-phase voltage Vc becomes the minimum voltage Vmin at the second sampling time T2. Also, the c-phase voltage Vc becomes the maximum voltage Vmax, the b-phase voltage Vb becomes the middle voltage Vmid, and the a-phase voltage Va becomes the minimum voltage Vmin at the third sampling time T3.

If the phase voltages Va, Vb, and Vc according to (a) of FIG. 17 are output, the maximum voltage Vmax, the middle voltage Vmid, and the minimum voltage Vmin may be determined as illustrated in (b) of FIG. 17.

In addition, a phase current of a phase identical to the maximum voltage Vmax (e.g. the a-phase at the first sampling time, the b-phase at the second sampling time, and the c-phase at the third sampling time) may be defined as a maximum current Imax, a phase current of a phase identical to the middle voltage Vmid may be defined as a middle current Imid, and a phase current of a phase identical to the minimum voltage Vmin may be defined as a minimum current Imin.

For example, the a-phase current Ia becomes the maximum current Imax, the c-phase current Ic becomes the middle current Imid, and the b-phase current Ib becomes the minimum current Imin at the first sampling time T1. Also, the b-phase current Ib becomes the maximum current Imax, the a-phase current Ia becomes the middle current Imid, and the c-phase current Ic becomes the minimum current Imin at the second sampling time T2. Also, the c-phase current Ic becomes the maximum current Imax, the b-phase current Ib becomes the middle current Imid, and the a-phase current Ia becomes the minimum current Imin at the third sampling time T3.

In other words, the maximum voltage Vmax, the middle voltage Vmid, and the minimum voltage Vmin are set in accordance with each of the levels of the phase voltages Va, Vb, and Vc, and the maximum current Imax, the middle current Imid, and the minimum current Imin may be set in accordance with the levels of the phase voltages Va, Vb, and Vc.

In addition, the neutral point current Idcn may be expressed by a sum of a product of the maximum voltage Vmax and the maximum current Imax, a product of the middle voltage Vmid and the middle current Imid, and a product of the minimum voltage Vmin and the minimum current Imin.

Here, when the offset voltage Voffset is added to each of the phase voltages Va, Vb, and Vc, the neutral point current Idcn may vary in accordance with the level of the offset voltage Voffset.

The neutral point current Idcn will be analyzed with respect to each case in accordance with the level of the offset voltage Voffset. Hereinafter, the maximum voltage, the middle voltage, and the minimum voltage to which the offset voltage Voffset is not added will be expressed as Vmax, Vmid, and Vmin, respectively, and the maximum voltage, the middle voltage, and the minimum voltage to which the zero-sequence voltage Voffset is added will be expressed as Vmax1, Vmid1, and Vmin1, respectively.

In other words, the maximum voltage Vmax, the middle voltage Vmid, and the minimum voltage Vmin to which the offset voltage Voffset is not added and the maximum voltage Vmax1, the middle voltage Vmid1, and the minimum voltage Vmin1 to which the offset voltage Voffset is added are related as shown in [Equation 16].

$$V_{max1,mid1,min1} = V_{max,mid,min} + V_{offset}$$ [Equation 16]

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, and Voffset represents the offset voltage.)

However, since the phase currents are not changed even when the offset voltage Voffset is added, there are no changes in the maximum current Imax, the middle current Imid, and the minimum current Imin. Also, since a sum of the phase currents Ia, Ib, and Ic becomes "0", a sum of the maximum current Imax, the middle current Imid, and the minimum current Imin also becomes "0".

First, a case where −Vmin<Voffset will be described.

When −Vmin<Voffset, all of the maximum voltage Vmax1, the middle voltage Vmid1, and the minimum voltage Vmin1 to which the offset voltage Voffset is added become positive values.

As a result, the neutral point current Idcn may be expressed by [Equation 17].

$$I_{dcn} = -\sum_{x=a,b,c} |V_{x,norm}| I_x$$ [Equation 17]

$$= -[V_{max1} I_{max} + V_{mid1} I_{mid} + V_{min1} I_{min}]$$

$$= -[V_{max} I_{max} + V_{mid} I_{mid} + V_{min} I_{min}] -$$

$$V_{offset}[I_{max} + I_{mid} + I_{min}]$$

$$= -[V_{max} I_{max} + V_{mid} I_{mid} + V_{min} I_{min}]$$

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, Imax represents the maximum current, Imid represents the middle current, Imin represents the minimum current, and Voffset represents the offset voltage.)

When −Vmin<Voffset, according to [Equation 17], the neutral point current Idcn has a constant value regardless of the level of the offset voltage Voffset.

Next, a case where −Vmid<Voffset<−Vmin will be described.

When −Vmid<Voffset<−Vmin, the maximum voltage Vmax1 and the middle voltage Vmid1 to which the offset voltage Voffset is added become positive values and the minimum voltage Vmin1 to which the offset voltage Voffset is added becomes a negative value.

As a result, the neutral point current Idcn may be expressed by [Equation 18].

$$I_{dcn} = -\sum_{x=a,b,c} |V_{x,norm}| I_x$$ [Equation 18]

$$= -[V_{max1} I_{max} + V_{mid1} I_{mid} - V_{min1} I_{min}]$$

$$= -[V_{max} I_{max} + V_{mid} I_{mid} - V_{min} I_{min}] -$$

$$V_{offset}[I_{max} + I_{mid} - I_{min}]$$

$$= -[V_{max} I_{max} + V_{mid} I_{mid} - V_{min} I_{min}] +$$

$$2V_{offset} I_{min}$$

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, Imax represents the maximum current, Imid represents the middle current, Imin represents the minimum current, and Voffset represents the offset voltage.)

When −Vmid<Voffset<−Vmin, according to [Equation 18], the neutral point current Idcn linearly changes in accordance with the level of the offset voltage Voffset.

Next, a case where −Vmax<Voffset<−Vmid will be described.

When −Vmax<Voffset<−Vmid, the maximum voltage Vmax1 to which the offset voltage Voffset is added becomes a positive value, and the middle voltage Vmid1 and the minimum voltage Vmin1 to which the offset voltage Voffset is added become negative values.

As a result, the neutral point current Idcn may be expressed by [Equation 19].

$$I_{dcn} = -\sum_{x=a,b,c} |V_{x,norm}| I_x \quad \text{[Equation 19]}$$
$$= -[V_{max1} I_{max} + V_{mid1} I_{mid} - V_{min1} I_{min}]$$
$$= -[V_{max} I_{max} - V_{mid} I_{mid} - V_{min} I_{min}] -$$
$$V_{offset}[I_{max} - I_{mid} - I_{min}]$$
$$= -[V_{max} I_{max} - V_{mid} I_{mid} - V_{min} I_{min}] -$$
$$2V_{offset} I_{max}$$

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, Imax represents the maximum current, Imid represents the middle current, Imin represents the minimum current, and Voffset represents the offset voltage.)

When −Vmax<Voffset<−Vmid, according to [Equation 19], the neutral point current Idcn linearly changes in accordance with the level of the offset voltage Voffset.

Next, a case where Voffset<−Vmax will be described.

When Voffset<−Vmax, all of the maximum voltage Vmax1, the middle voltage Vmid1, and the minimum voltage Vmin1 to which the offset voltage Voffset is added become negative values.

As a result, the neutral point current Idcn may be expressed by [Equation 20].

$$I_{dcn} = -\sum_{x=a,b,c} |V_{x,norm}| I_x \quad \text{[Equation 20]}$$
$$= [V_{max1} I_{max} + V_{mid1} I_{mid} + V_{min1} I_{min}]$$
$$= [V_{max} I_{max} + V_{mid} I_{mid} + V_{min} I_{min}] +$$
$$V_{offset}[I_{max} + I_{mid} + I_{min}]$$
$$= [V_{max} I_{max} + V_{mid} I_{mid} + V_{min} I_{min}]$$

(Here, Vmax1 represents the maximum voltage to which the offset voltage is added, Vmid1 represents the middle voltage to which the offset voltage is added, Vmin1 represents the minimum voltage to which the offset voltage is added, Vmax represents the maximum voltage to which the offset voltage is not added, Vmid represents the middle voltage to which the offset voltage is not added, Vmin represents the minimum voltage to which the offset voltage is not added, Imax represents the maximum current, Imid represents the middle current, Imin represents the minimum current, and Voffset represents the offset voltage.)

When Voffset<−Vmax, according to [Equation 20], the neutral point current Idcn has a constant value regardless of the level of the offset voltage Voffset.

As described above, the neutral point current Idcn changes in accordance with the offset voltage Voffset. Consequently, the neutral point current Idcn may be calculated from the offset voltage Voffset.

Furthermore, when the neutral point current Idcn for minimizing the change in the neutral point voltage Vdcn is determined, the offset voltage Voffset may be determined according to the determined neutral point current Idcn.

In addition, the neutral point current Idcn may be calculated from the difference ΔVdcn between the voltage VdcH between the both ends of the upper capacitor C7a and the voltage VdcL between the both ends of the lower capacitor C7b.

Based on the theories described above, the neutral point voltage control module 230 may include a neutral point current calculator 231, an offset voltage calculator 233, and an offset voltage limiter 235 as illustrated in FIG. 18.

The neutral point current calculator 231 calculates the neutral point current Idcn from the DC voltage Vdc detected by the voltage detection unit 130 and the neutral point voltage Vdcn.

Specifically, the neutral point current calculator 231 may calculate the difference ΔVdcn between the voltage VdcH between the both ends of the upper capacitor C7a and the voltage VdcL between the both ends of the lower capacitor C7b from the DC voltage Vdc and the neutral point voltage Vdcn, and may calculate a neutral point current reference Idcn* from the difference ΔVdcn between the voltage VdcH between the both ends of the upper capacitor C7a and the voltage VdcL between the both ends of the lower capacitor C7b.

The neutral point current calculator 231 may include at least one of the proportional controller, the proportional integral controller, and the proportional integral differential controller that is input with the difference ΔVdcn between the voltage VdcH between the both ends of the upper capacitor C7a and the voltage VdcL between the both ends of the lower capacitor C7b and outputs the neutral point current reference Idcn*.

The offset voltage calculator 233 calculates the offset voltage Voffset from the first voltage reference Vabcs* output by the motor speed control module 210, the current reference Iabcs* and the neutral point current Idcn output by the neutral point current calculator 231.

Specifically, the offset voltage calculator 233 may calculate the maximum voltage Vmax, the middle voltage Vmid, the minimum voltage Vmin, the maximum current Imax, the middle current Imid, and the minimum current Imin from the first voltage reference vabcs* and the current reference Iabcs* of the motor speed control module 210. Then, the offset voltage calculator 233 may calculate the offset voltage Voffset by applying the maximum voltage Vmax, the middle voltage Vmid, the minimum voltage Vmin, the maximum current Imax, the middle current Imid, and the minimum current Imin to [Equation 17] to [Equation 20].

The offset voltage limiter 235 receives the offset voltage Voffset from the offset voltage calculator 233 and the maximum offset voltage Voffset.max and the minimum offset voltage Voffset.min from the stabilizing voltage limiting module 260, and outputs the third voltage reference Vsn*.

Specifically, the offset voltage limiter 235 outputs the minimum offset voltage Voffset.min as the third voltage reference Vsn* when the offset voltage Voffset calculated from the offset voltage calculator 233 is less than the minimum offset voltage Voffset.min. Also, the offset voltage limiter 235 outputs the offset voltage Voffset calculated from the offset voltage calculator 233 as the third voltage reference Vsn* when the offset voltage Voffset is equal to or greater than the minimum offset voltage Voffset.min and equal to or less than the maximum offset voltage Voffset.max. Also, the offset voltage limiter 235 outputs the maximum offset voltage Voffset.max as the third voltage reference Vsn* when the offset voltage Voffset is greater than the maximum offset voltage Voffset.max.

The third voltage reference Vsn* is limited by the maximum offset voltage Voffset.max and the minimum offset voltage Voffset.min received from the stabilizing voltage limiting module 260.

As described above, the neutral point voltage control module 230 may calculate the third voltage reference Vsn* for stabilizing the neutral point voltage Vdcn from the DC voltage Vdc, the neutral point voltage Vdcn, the first voltage reference Vabcs*, the maximum offset voltage Voffset.max, and the minimum offset voltage Voffset.min.

The stabilizing voltage limiting module 260 outputs the value of k for limiting the second voltage reference Vabch*, and the maximum offset voltage Voffset.max and the minimum offset voltage Voffset.min for limiting the third voltage reference Vsn* according to the first voltage reference Vabcs* output by the motor speed control module 210.

The first voltage reference Vabcs* output by the motor speed control module 210, the second voltage reference Vabch* output by the DC voltage control module 220, and the third voltage reference Vsn* output by the neutral point voltage control module 230 are added by the adder 240.

Here, the sum of the first voltage reference Vabcs*, the second voltage reference Vabch*, and the third voltage reference Vsn* is limited by the voltage limiter 270 to the DC voltage Vdc. Since the DC voltage Vdc is applied to the 3-level inverter 110, the 3-level inverter 110 cannot output a voltage higher than the DC voltage Vdc.

Since each of the motor speed control module 210, the DC voltage control module 220, and the neutral point voltage control module 230 operates independently, the sum of the first voltage reference Vabcs*, the second voltage reference Vabch*, and the third voltage reference Vsn* being limited by the DC voltage Vdc is not considered.

In contrast, when the motor MO outputs the maximum torque and rotates at the maximum speed, the sum of the first voltage reference Vabcs*, the second voltage reference Vabch*, and the third voltage reference Vsn* may become greater than the DC voltage Vdc. In this way, when the sum of the first voltage reference Vabcs*, the second voltage reference Vabch*, and the third voltage reference Vsn* becomes greater than the DC voltage Vdc, the control module 200 outputs the phase voltage limited by the DC voltage Vdc, and the 3-level inverter 110 may not be able to apply a sufficient level of voltage to the motor MO.

To prevent the case where the 3-level inverter 110 cannot apply a sufficient voltage to the motor MO, the stabilizing voltage limiting module 260 may limit an output voltage of the DC voltage control module 220 and an output voltage of the neutral point voltage control module 230 in accordance with a preset order of priority.

Limiting the output voltage of the DC voltage control module 220 and the output voltage of the neutral point voltage control module 230 in accordance with the priority of the motor speed control module 210, the DC voltage control module 220, and the neutral point voltage control module 230 will be described in detail below.

Each of the motor speed control module 210, the DC voltage control module 220, and the neutral point voltage control module 230 performs a different function. As a result, the order of priority of the control modules 210, 220, and 230 may be set differently in accordance with a driving environment of the motor MO.

The first voltage reference Vabcs* output by the motor speed control module 210 becomes an important element in determining a driving zone of the motor MO. A speed-torque curve of a motor system including the motor driving apparatus 1 and the motor MO is determined according to parameters such as the resistance, inductance, and counter electromotive force of the motor MO and the DC voltage and the rated current. The speed-torque curve is referred to as a capability curve.

A load to be driven using the motor MO should be positioned within the capability curve described above, and the minimum voltage that may be used by the motor speed control module 210 should be secured in accordance with the load. When the minimum voltage for the motor speed control module 210 is not secured, the motor MO cannot drive the load. Here, the load to be driven by the motor system includes a control of a dynamic speed and a torque in accordance with a power factor or an instantaneous load pattern. Also, the driving of the load should consider the weak magnetic flux control.

The DC voltage control module 220 calculates the damping voltage Vdamp.dq using [Equation 12]. According to [Equation 12], the damping voltage Vdamp.dq is determined in accordance with the k, the DC voltage Vdc, the voltage source voltage Vs, etc. The value of k is a variable that affects stability of the control module 200, and has a value of 1 theoretically but may actually have a value greater than 1. The voltage source voltage Vs is not an ideal power and is a voltage in consideration of the inductance and the rectification of diodes. Since the damping voltage Vdamp.dq is for forming the damping current Idamp, the damping voltage Vdamp.dq is controlled by the same phase as the driving current Iabc.

When a range of a voltage that may be used by the DC voltage control module 220 decreases among the DC voltage Vdc, the pulsation of the DC voltage Vdc increases, and a harmonic wave of a current input from the external power source ES increases.

The neutral point voltage control module 230 determines a charge amount of the neutral point in accordance with a modulation index (MI) and the power factor and controls the voltage of the neutral point in accordance with the charge amount of the neutral point. In other words, when the MI and the power factor are determined, the capacitance of the DC link unit 6 and the change in the neutral point voltage Vdcn are inversely proportional to each other.

In this way, when the film capacitors are used in the DC link unit 6, the change in the neutral point voltage Vdcn increases. Consequently, to stabilize the neutral point voltage Vdcn, a voltage that may be used by the neutral point voltage control module 230 should be sufficiently provided. If the range of the voltage for controlling the neutral point voltage Vdcn decreases, a range of a controllable neutral point current decreases, and the pulsation of the neutral point voltage Vdcn increases.

A sufficient voltage is required for each of the motor speed control module 210, the DC voltage control module 220, and the neutral point voltage control module 230 to sufficiently perform its function. However, since the DC voltage Vdc is limited by the external power source ES, the order of priority among the motor speed control module 210, the DC voltage control module 220, and the neutral point voltage control module 230 should be set and the voltage that may be used by each of the motor speed control module 210, the DC voltage control module 220, and the neutral point voltage control module 230 should be properly distributed in accordance with the order of priority.

First, when the priority of driving a load and efficiency is high, the voltage used by the motor speed control module 210 should be sufficiently secured. As the voltage that may be used by the motor speed control module 210 increases, the current for a weak magnetic flux decreases, and the efficiency of the motor MO increases.

To sufficiently secure the voltage used by the motor speed control module 210, the value of k for damping the pulsation of the DC voltage Vdc may be set to a value close to 1, the maximum offset voltage Voffset.max may be set as a smallest possible value, and the minimum offset voltage Voffset.min may be set as a largest possible value.

In this case, the pulsation of the neutral point voltage Vdcn increases and the harmonic wave of the current input from the external power source ES increases. To prevent damages of circuits caused by the above, the designer may increase the capacitance of the DC link unit 6 and add a filter to the motor driving apparatus 1.

Next, when the priority of decreasing the pulsation of the DC voltage Vdc is high, the voltage used by the DC voltage control module 220 should be sufficiently secured. To secure the voltage that may be used by the DC voltage control module 220, the value of k for damping the pulsation of the DC voltage Vdc may be set as a greatest possible value, the voltage used by the motor speed control module 210 may be set as the minimum voltage, the maximum offset voltage Voffset.max may be set as the smallest possible value, and the minimum offset voltage Voffset.min may be set as the largest possible value.

In this case, the weak magnetic flux is intensified and the efficiency decreases in the motor speed control module 210. Also, the voltage that may be used by the neutral point voltage control module 230 may decrease such that the pulsation of the neutral point voltage Vdcn may increase. To prevent damages of the circuits caused by the above, the designer may increase the capacitance of the DC link unit 6.

Next, when the priority of decreasing the pulsation of the neutral point voltage Vdcn is high, the voltage used by the neutral point voltage control module 230 should be sufficiently secured. To secure the voltage that may be used by the neutral point voltage control module 230, the voltage use by the motor speed control module 210 may be set as the smallest possible voltage, and the value of k for damping the pulsation motion of the DC voltage Vdc may be set as a value closer to 1.

In this case, the weak magnetic flux is intensified and the efficiency decreases in the motor speed control module 210. Also, the voltage that may be used by the DC voltage control module 220 may decrease such that the harmonic wave of the current input from the external power source ES may increase. To prevent damages of the circuits caused by the above, the designer may add a filter.

Based on the theories described above, the stabilizing voltage limiting module 260 may output the value of k for damping the pulsation of the DC voltage Vdc and the maximum offset voltage Voffset.max and the minimum offset voltage Voffset.min of the offset voltage Voffset for decreasing the pulsation of the neutral point voltage Vdcn may be output according to the DC voltage Vdc and the first voltage reference Vabcs*.

Specifically, when the first voltage reference Vabcs* is lower than the reference voltage, the stabilizing voltage limiting module 260 may output a preset reference value of k, a preset reference maximum offset voltage Voffset.max, and the minimum offset voltage Voffset.min.

In addition, when the first voltage reference Vabcs* is higher than the reference voltage, the value of k may be decreased in accordance with the level of the first voltage reference Vabcs*, and a variation range of the offset voltage Voffset by the maximum offset voltage Voffset.max and the minimum offset voltage Voffset.min may be decreased. Specifically, the stabilizing voltage limiting module 260 may decrease the value of k and decrease the variation range of the offset voltage Voffset by the maximum offset voltage Voffset.max and the minimum offset voltage Voffset.min such that the second voltage reference Vabch* and the third voltage reference Vsn* decreases when the first voltage reference Vabcs* increases for the 3-level inverter 110 to be able to supply sufficient power to the motor MO.

Here, the decreased amount of the value of k and the decreased amount of the variation range of the offset voltage Voffset in accordance with the level of the first voltage reference Vabcs* may change in accordance with the order of priority among the motor speed control module 210, the DC voltage control module 220, and the neutral point voltage control module 230.

When the order of priority of driving the load and the efficiency is high, the reference voltage may be set as a value close to the DC voltage Vdc, and the reference k and the reference maximum offset voltage may be set as the smallest possible value. For example, the reference voltage may be set as 90% or greater of the DC voltage Vdc, the reference k may be set as "1", and the reference maximum offset voltage may be set as 5% or less of the DC voltage Vdc.

In addition, when the order of priority of decreasing the pulsation of the DC voltage Vdc is high, the reference k may be set as a large value, and the reference voltage and the reference maximum offset voltage may be set as small values. For example, the reference voltage may be set as 80% or less of the DC voltage Vdc, the reference k may be set as "5", and the reference maximum offset voltage may be set as 5% or less of the DC voltage Vdc.

In addition, when the order of priority of decreasing the pulsation of the neutral point voltage Vdcn is high, the reference maximum offset voltage may be set as a large value, and the reference k and the reference voltage and may be set as small values. For example, the reference voltage may be set as 80% or less of the DC voltage Vdc, the reference k may be set as "1", and the reference maximum offset voltage may be set as 10% or greater of the DC voltage Vdc.

As described above, the stabilizing voltage limiting module 260 may adjust the value of k for damping the pulsation of the DC voltage Vdc and the maximum offset voltage Voffset.max and the minimum offset voltage voffset.min of the offset voltage Voffset for decreasing the pulsation of the neutral point voltage Vdcn in accordance with the first voltage reference Vabcs* output by the motor speed control module 210.

The control module 200 adds the first voltage reference Vabcs* output by the motor speed control module 210 described above, the second voltage reference Vabch* output by the DC voltage control module 220, and the third voltage reference Vsn* output by the neutral point voltage control module 230, and modulates the pulse width of the added final voltage reference Vabcn*.

As a result, the control module 200 may control the rotation speed of the motor MO and provide the control signal that stabilizes the DC voltage Vdc and the neutral point voltage Vdcn to the driving circuit 140.

In the above, the configurations and operations of the motor driving apparatus 1 according to an embodiment have been described.

Hereinafter, an example of an actual operation of the motor driving apparatus 1 according to an embodiment will be described. In the example of the operation to be described below, the motor driving apparatus 1 accelerates a buried type permanent magnet synchronous motor for driving a compressor included in a 10 kW-level air conditioner up to 6600 rpm from a standstill state, and drives the motor at a constant speed at 6600 rpm. The motor driving apparatus 1 performs a weak magnetic flux control at 4000 rpm or greater.

The DC link unit 6 of the motor driving apparatus 1 includes the upper film capacitor C7a and the lower film capacitor C7b of 30 µF, and the motor driving apparatus 1 has given priority to stability of the DC voltage Vdc and the driving efficiency of the motor MO.

In addition, the external power source ES is a three-phase AC power of 380 V, and the inductance of the external power source ES is assumed to be 380 µH.

Figure 19:
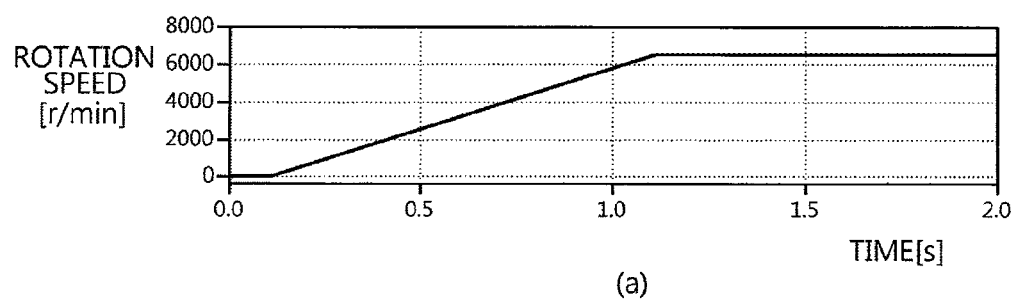
FIG. 19 illustrates a rotation speed and a torque of a motor driven by the motor driving apparatus according to an embodiment.
Figure 19:
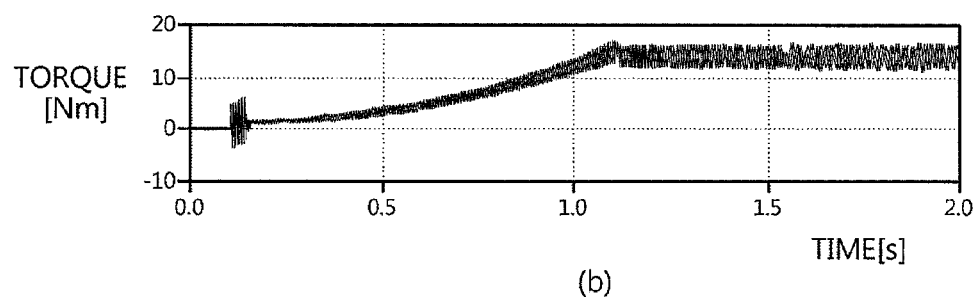

FIG. 19 illustrates a rotation speed and a torque of a motor driven by the motor driving apparatus according to an embodiment.

As illustrated in (a) of FIG. 19, the rotation speed of the motor MO gradually increases from the standstill state by the driving of the motor driving apparatus 1, and the motor MO rotates at a rotation speed of 6600 rpm after approximately one second. As illustrated in (b) of FIG. 19, the torque of the motor MO gradually increases by the driving of the motor driving apparatus 1, and the motor MO outputs a torque of approximately 11 Nm to 17 Nm after approximately 1.1 seconds.

Figure 20:
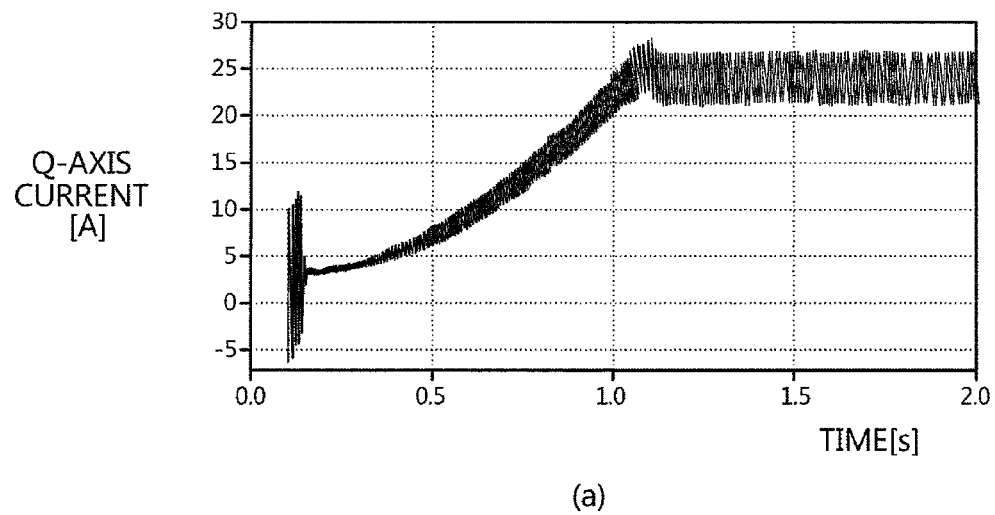
FIG. 20 illustrates a d-axis current and a q-axis current of the motor driving apparatus according to an embodiment.
Figure 20:
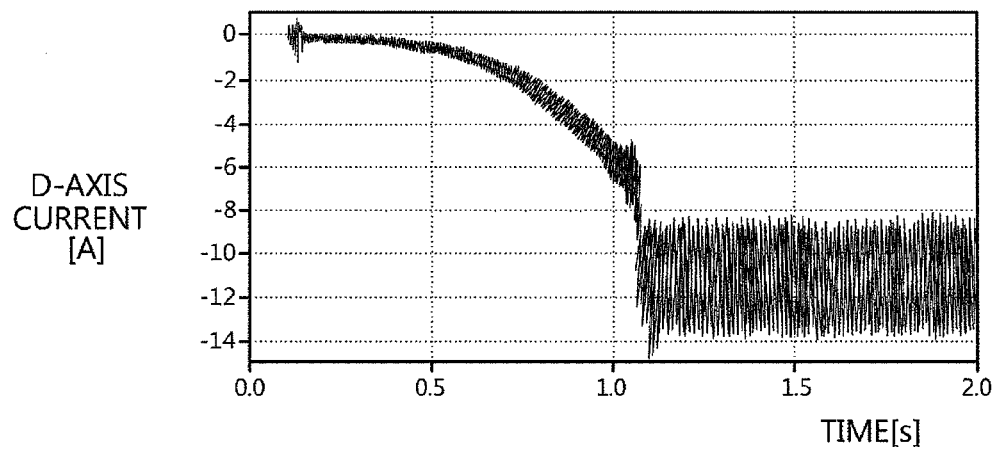

In addition, FIG. 20 illustrates a d-axis current and a q-axis current of the motor driving apparatus according to an embodiment.

As illustrated in (a) of FIG. 20, the q-axis current Iq of the motor driving apparatus 1 gradually increases as the rotation speed and the torque of the motor MO increases, and becomes approximately 21 A to 26 A after approximately 1.1 seconds. Also, the d-axis current Id of the motor driving apparatus 1 gradually increases by the weak magnetic flux control of the motor driving apparatus 1 and becomes approximately −8 A to −14 A after approximately 1.1 seconds.

Figure 21:
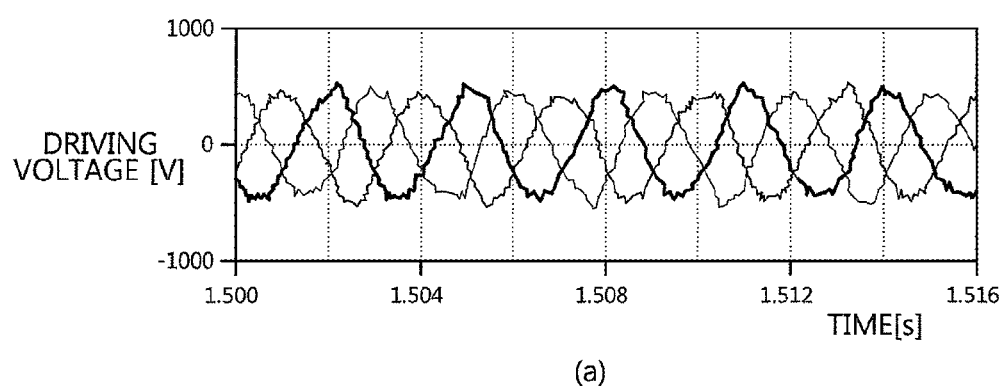
FIG. 21 illustrates a driving voltage and a driving current output by the motor driving apparatus according to an embodiment.
Figure 21:
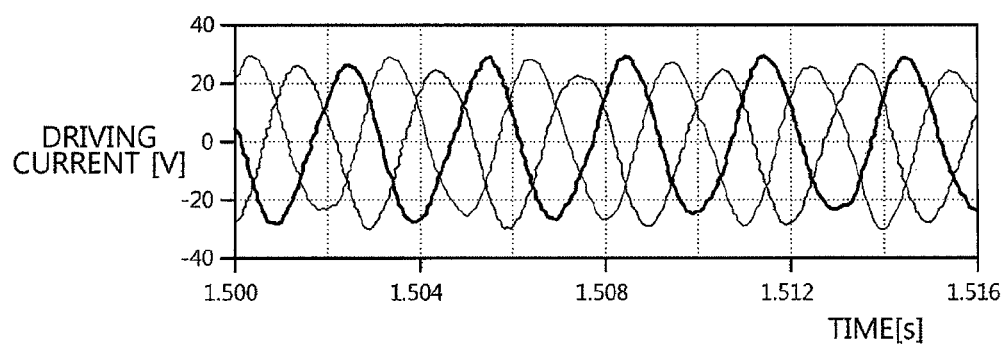

In addition, FIG. 21 illustrates a driving voltage and a driving current output by the motor driving apparatus according to an embodiment. Specifically, FIG. 21 illustrates a driving voltage and a driving current 1.5 seconds after the motor driving apparatus 1 has started.

When the motor MO is rotating at a constant speed, the motor driving apparatus 1 applies the driving voltage Vabc of a sine wave form having a maximum value of approximately 450 V to the motor MO as illustrated in (a) of FIG. 21. Also, the motor driving apparatus 1 supplies the driving current Iabc of a sine wave form having a maximum value of approximately 30 A to the motor MO as illustrated in (b) of FIG. 21.

When the stability of the DC voltage Vdc and the driving efficiency of the motor MO have priority, the motor driving apparatus 1 may supply a sufficient power in accordance with a load of the motor MO to the motor MO as illustrated in FIGS. 19 to 21.

Figure 22:
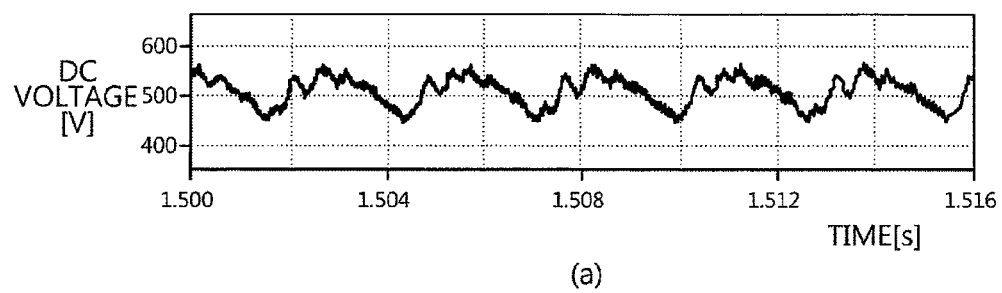
FIG. 22 illustrates an output voltage of the DC link unit included in the motor driving apparatus according to an embodiment.
Figure 22:
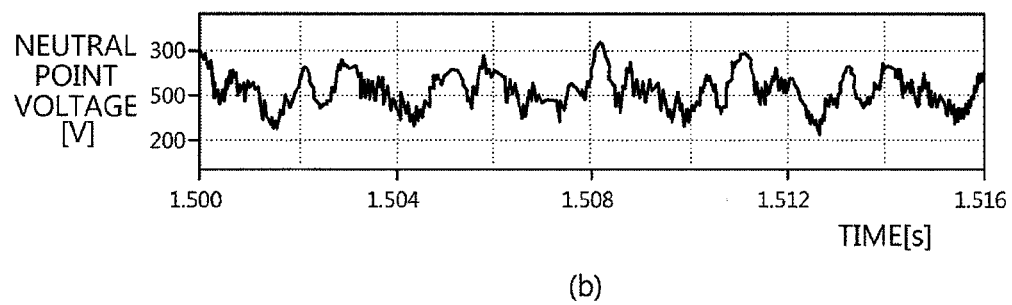

FIG. 22 illustrates an output voltage of the DC link unit included in the motor driving apparatus according to an embodiment. Specifically, FIG. 22 illustrates an output voltage of the DC link unit 1.5 seconds after the motor driving apparatus 1 has started.

The DC voltage Vdc of the DC link unit 6 included in the motor driving apparatus 1 varies from approximately 450 V to 550 V as illustrated in (a) of FIG. 22. In other words, approximately 100 V of pulsation occurs in the DC voltage Vdc. Also, the neutral point voltage Vdcn of the DC link unit 6 varies from approximately 225 V to 275 V as illustrated in (b) of FIG. 22. In other words, approximately 50 V of pulsation occurs in the neutral point voltage Vdcn.

Figure 23:
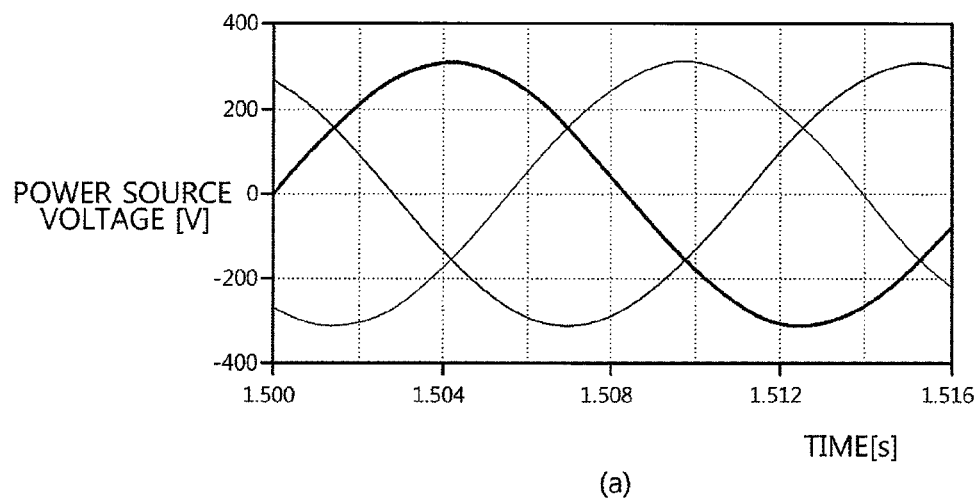
FIG. 23 illustrates a power source voltage and a power source current input to the motor driving apparatus according to an embodiment.
Figure 23:
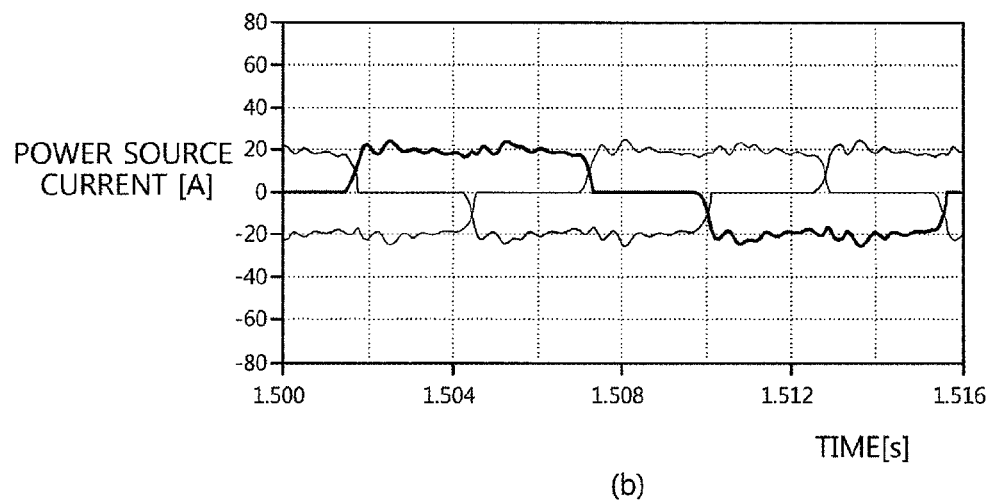

In addition, FIG. 23 illustrates a power source voltage and a power source current input to the motor driving apparatus according to an embodiment. Specifically, FIG. 23 illustrates a power source voltage and a power source current 1.5 seconds after the motor driving apparatus 1 has started.

As illustrated in (a) and (b) of FIG. 23, a three-phase AC voltage having a maximum value of approximately 310 V is applied and approximately 20 A of three-phase AC current is supplied to the motor driving apparatus 1.

When a priority is given to the stability of the DC voltage Vdc and the driving efficiency of the motor MO, a harmonic wave of the power source current supplied from the external power source ES is damping and some pulsation occurs in the neutral point voltage Vdcn in the motor driving apparatus 1 as illustrated in FIGS. 22 and 23.

However, the pulsation of the neutral point voltage Vdcn occurring in the motor driving apparatus 1 is not great enough to damage the switching elements Q11 to Q14, Q21 to Q24, and Q31 to Q34 included in the 3-level inverter 110.

As described above, the control module 200 to control the 3-level inverter 110 included in the motor driving apparatus 1 includes the motor speed control module 210 to control driving of the motor MO, the DC voltage control module 220 to stabilize the DC voltage Vdc output by the DC link unit 6, the neutral point voltage control module 230 to stabilize the neutral point voltage Vdcn output by the DC link unit 6, and the stabilizing voltage limiting module 260 to control a stabilization operation of the DC voltage and a stabilization operation of the neutral point voltage in accordance with a driving operation of the motor MO.

In addition, the stabilizing voltage limiting module 260 may limit operations of the DC voltage control module 220 and the neutral point voltage control module 230 in accordance with the order of priority among the driving efficiency of the motor MO, damping the harmonic wave of the power source current, and stabilizing the neutral point voltage.

According to one aspect of the disclosure, a motor driving apparatus having a sufficient life and a small volume may be provided by using a low-capacity film capacitor.

According to another aspect of the disclosure, a motor driving apparatus capable of stably providing a DC voltage and a neutral point voltage to a 3-level inverter even when a low-capacity capacitor is used at a DC terminal may be provided by controlling the DC voltage using a damping current and controlling the neutral point voltage using a offset voltage.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A motor driving apparatus comprising:
a rectifying circuit configured to rectify an AC power supplied from an external AC power source;
at least one film capacitor configured to output a DC voltage and a neutral point voltage according to a voltage rectified by the rectifying circuit;
a 3-level inverter configured to supply a driving current to a motor using a DC voltage applied from a DC link unit; and
a control module configured to control the 3-level inverter,
wherein the control module comprises:
a motor speed control module configured to control rotation of the motor;
a DC voltage control module configured to stabilize the DC voltage;
a neutral point voltage control module configured to stabilize the neutral point voltage; and
a stabilizing voltage limiting module configured to control the DC voltage control module and the neutral point voltage control module according to an output of the motor speed control module.

2. The motor driving apparatus according to claim 1, wherein the motor speed control module outputs a first voltage reference for controlling a rotation speed of the motor according to the rotation speed of the motor and the driving current.

3. The motor driving apparatus according to claim 2, wherein, when the first voltage reference is greater than a reference voltage, the stabilizing voltage limiting module decreases outputs of the DC voltage control module and the neutral point voltage control module.

4. The motor driving apparatus according to claim 3, wherein the stabilizing voltage limiting module outputs a proportional constant to control the DC voltage control module and a maximum offset voltage and a minimum offset voltage to control the neutral point voltage control module according to the first voltage reference.

5. The motor driving apparatus according to claim 4, wherein, when the first voltage reference is greater than the reference voltage, the stabilizing voltage limiting module decreases the proportional constant and the maximum offset voltage.

6. The motor driving apparatus according to claim 5, wherein, when the first voltage reference is equal to or smaller than the reference voltage, the stabilizing voltage limiting module outputs a reference proportional constant, a reference maximum offset voltage, and a reference minimum offset voltage.

7. The motor driving apparatus according to claim 6, wherein the reference voltage is changed in accordance with a priority of the motor speed control module.

8. The motor driving apparatus according to claim 6, wherein the reference proportional constant is changed in accordance with a priority of the DC voltage control module.

9. The motor driving apparatus according to claim 6, wherein the reference maximum offset voltage is changed in accordance with a priority of the neutral point voltage control module.

10. The motor driving apparatus according to claim 4, wherein the DC voltage control module outputs a second voltage reference proportional to the proportional constant for stabilizing the DC voltage.

11. The motor driving apparatus according to claim 10, wherein the DC voltage control module comprises:
an equivalent driving current estimator configured to estimate an equivalent driving current supplied to the motor according to the DC voltage and the first voltage reference;
an equivalent supplied voltage estimator configured to estimate an equivalent supplied voltage supplied from the external AC power source according to the first voltage reference and the equivalent driving current; and
a damping voltage calculator configured to calculate the second voltage reference from the DC voltage, the first voltage reference, the equivalent supplied voltage, and the proportional constant.

12. The motor driving apparatus according to claim 4, wherein the neutral point voltage control module outputs a third voltage reference limited by the maximum offset voltage for stabilizing the neutral point voltage.

13. The motor driving apparatus according to claim 12, wherein the neutral point voltage control module comprises:
a neutral point current calculator configured to calculate a neutral point current from the DC voltage and the neutral point voltage;
an offset voltage calculator configured to calculate a offset voltage, that stabilizes the neutral point voltage, from the neutral point current and the voltage references; and
an offset voltage limiter configured to calculate the third voltage reference from the offset voltage and the maximum offset voltage.

14. The motor driving apparatus according to claim 1, wherein the at least one film capacitor comprises an upper film capacitor and a lower film capacitor connected to each other in series.

15. The motor driving apparatus according to claim 1, wherein the DC voltage is a voltage between both ends of the upper film capacitor and a lower film capacitor, and the neutral point voltage is a voltage between the both ends of the lower film capacitor.

16. A system comprising:
an Alternating Current (AC) to Direct Current (DC) circuit configured to receive an AC power supplied from an external AC power source and output a DC voltage;
a DC link circuit coupled to an output of the AC to DC (AC-DC) circuit and configured to removing a ripple of the DC voltage Vdc and output a stabilized DC voltage and a neutral point voltage, the DC link circuit comprising at least one film capacitor configured to output the stabilized DC voltage and the neutral point voltage;
a DC to AC (DC-AC) circuit coupled to an output of the DC link circuit and configured to, in response to driving signals received from a driving circuit, supply a driving current to a motor using the stabilized DC voltage; and
a control circuit configured to send control signals to the driving circuit, the control circuit comprising:
a motor speed control module configured to control rotation of the motor;
a DC voltage control module configured to stabilize the DC voltage;
a neutral point voltage control module configured to stabilize the neutral point voltage; and
a stabilizing voltage limiting module configured to control the DC voltage control module and the neutral point voltage control module according to an output of the motor speed control module.

17. The system according to claim 16, wherein the motor speed control module outputs a first voltage reference for controlling a rotation speed of the motor according to the rotation speed of the motor and the driving current.

18. The system according to claim 17, wherein, when the first voltage reference is greater than a reference voltage, the stabilizing voltage limiting module decreases outputs of the DC voltage control module and the neutral point voltage control module.

19. The system according to claim 18, wherein the stabilizing voltage limiting module outputs a proportional constant to control the DC voltage control module and a maximum offset voltage and a minimum offset voltage to control the neutral point voltage control module according to the first voltage reference.

20. The system according to claim 19, wherein, when the first voltage reference is greater than the reference voltage, the stabilizing voltage limiting module decreases the proportional constant and the maximum offset voltage.

\* \* \* \* \*